(12) United States Patent
Wang

(10) Patent No.: US 11,042,856 B2
(45) Date of Patent: *Jun. 22, 2021

(54) SYSTEM AND METHOD FOR GEO-AWARE TRANSPORTATION BILLING VERIFICATION

(71) Applicant: Kevin Sunlin Wang, Flushing, NY (US)

(72) Inventor: Kevin Sunlin Wang, Flushing, NY (US)

(73) Assignee: Operr Technologies, Inc, Flushing, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/286,374

(22) Filed: Feb. 26, 2019

(65) Prior Publication Data

US 2019/0188666 A1 Jun. 20, 2019

Related U.S. Application Data

(63) Continuation of application No. 15/474,685, filed on Mar. 30, 2017, now Pat. No. 10,504,079.

(Continued)

(51) Int. Cl.
*G06Q 20/14* (2012.01)
*G06Q 20/08* (2012.01)
*G06Q 20/32* (2012.01)

(52) U.S. Cl.
CPC ......... *G06Q 20/14* (2013.01); *G06Q 20/0855* (2013.01); *G06Q 20/3224* (2013.01)

(58) Field of Classification Search
CPC . G06Q 20/14; G06Q 20/0855; G06Q 20/3224
See application file for complete search history.

(56) References Cited

U.S. PATENT DOCUMENTS 5,961,572 A 10/1999 Craport et al.
7,415,431 B2 8/2008 Pintsov
(Continued)

FOREIGN PATENT DOCUMENTS

WO WO 2009/058117 5/2009

OTHER PUBLICATIONS

McNeir, D. Kevin, "Taxis Now Serving Seniors: DC Cab Commission Offers Helping Hand," Washington Informer, suppl. Health Wellness & Nutrition Supplement, H12, Washington DC, Mar. 2015.*

(Continued)

*Primary Examiner* — Nathan Erb

(57) ABSTRACT

A geo-aware transportation verification system and is disclosed. A processor receives a billing request for payment, including an actual geolocation and an actual time and date. The processor compares a service request to a billing request to determine whether a driver is within a field of acceptability. There are at least three types of fields of acceptability for assisting billing verification, where one may be active at a time. The processor automatically adjusts the billing request to match the service request if the driver is within a field of acceptability for geolocation and time. The processor conditionally rejects a billing request if the driver is not within the field of acceptability and provides a user engagement panel on which the user is allowed to submit billing relevant data for further verification. The field of acceptability is updated dynamically based on collected data.

30 Claims, 21 Drawing Sheets

Related U.S. Application Data

(60) Provisional application No. 62/421,086, filed on Nov. 11, 2016.

(56) References Cited

U.S. PATENT DOCUMENTS

| | | | |
|---|---|---|---|
| 8,019,622 B2 | 9/2011 | Kaboff et al. | |
| 8,325,974 B1* | 12/2012 | Killalea | G06F 16/24578 |
| | | | 382/100 |
| 8,364,711 B2 | 1/2013 | Wilkins et al. | |
| 8,554,608 B1* | 10/2013 | O'Connor | G08G 1/0962 |
| | | | 705/1.1 |
| 8,571,884 B2 | 10/2013 | Badgett et al. | |
| 9,000,903 B2 | 4/2015 | Bowers et al. | |
| 9,002,384 B1* | 4/2015 | Hallenbeck | G06Q 10/06312 |
| | | | 455/457 |
| 9,037,394 B2 | 5/2015 | Fernandes et al. | |
| 9,305,310 B2 | 4/2016 | Radhakrishnan et al. | |
| 9,418,382 B2 | 8/2016 | Gryan et al. | |
| 9,552,564 B1 | 1/2017 | Martenis | |
| 9,740,823 B2 | 8/2017 | Breazeale, Jr. | |
| 10,504,079 B2* | 12/2019 | Wang | G06Q 20/14 |
| 2002/0123917 A1* | 9/2002 | Wolfe | G06Q 10/08 |
| | | | 340/5.9 |
| 2003/0195836 A1* | 10/2003 | Hayes | G06Q 40/04 |
| | | | 705/37 |
| 2005/0187836 A1* | 8/2005 | Wolfe | G06Q 10/08 |
| | | | 705/28 |
| 2007/0299689 A1 | 12/2007 | Jones et al. | |
| 2008/0262728 A1* | 10/2008 | Lokshin | G01C 21/165 |
| | | | 701/472 |
| 2009/0048865 A1 | 2/2009 | Breazeale, Jr. | |
| 2009/0228300 A1* | 9/2009 | Hamel | G06Q 10/08355 |
| | | | 705/2 |
| 2011/0238543 A1* | 9/2011 | Paez | G06Q 10/08 |
| | | | 705/32 |
| 2011/0261890 A1* | 10/2011 | Nagura | H04L 63/105 |
| | | | 375/259 |
| 2011/0313804 A1* | 12/2011 | Camp | G06Q 10/063 |
| | | | 705/7.13 |
| 2011/0320232 A1* | 12/2011 | Staffaroni | G06Q 10/06311 |
| | | | 705/7.13 |
| 2012/0041675 A1 | 2/2012 | Juliver et al. | |
| 2012/0109796 A1* | 5/2012 | Mashal | G06Q 30/04 |
| | | | 705/34 |
| 2013/0185221 A1* | 7/2013 | Adams | G06Q 50/28 |
| | | | 705/333 |
| 2013/0217414 A1* | 8/2013 | Nagaraj | H04W 4/029 |
| | | | 455/456.2 |
| 2013/0293397 A1* | 11/2013 | Nagy | G07B 15/063 |
| | | | 340/989 |
| 2013/0311211 A1 | 11/2013 | Zafar et al. | |
| 2014/0032427 A1* | 1/2014 | Gannon | G06Q 50/182 |
| | | | 705/309 |
| 2014/0089243 A1* | 3/2014 | Oppenheimer | G06F 11/3419 |
| | | | 706/46 |
| 2014/0351163 A1* | 11/2014 | Tussy | G06Q 10/083 |
| | | | 705/330 |
| 2014/0351164 A1* | 11/2014 | Ballenger | G01C 21/343 |
| | | | 705/338 |
| 2015/0031397 A1 | 1/2015 | Jouaux et al. | |
| 2015/0046298 A1* | 2/2015 | Zwakhals | G06Q 10/087 |
| | | | 705/28 |
| 2015/0172919 A1* | 6/2015 | Basnayake | H04L 51/38 |
| | | | 455/411 |
| 2015/0186842 A1* | 7/2015 | Daniarov | G06Q 10/0838 |
| | | | 705/341 |
| 2015/0347478 A1* | 12/2015 | Tripathi | G06F 16/29 |
| | | | 707/743 |
| 2016/0042303 A1* | 2/2016 | Medina | G01C 21/3438 |
| | | | 705/5 |
| 2016/0063658 A1* | 3/2016 | Breazeale, Jr. | G06Q 10/10 |
| | | | 705/2 |
| 2016/0155086 A1* | 6/2016 | Fuller | G06Q 10/08 |
| | | | 705/333 |
| 2016/0162872 A1* | 6/2016 | Votaw | G06Q 20/40 |
| | | | 705/44 |
| 2016/0171884 A1* | 6/2016 | Chen | G08G 1/0112 |
| | | | 701/117 |
| 2016/0247095 A1 | 8/2016 | Scicluna et al. | |
| 2016/0272196 A1* | 9/2016 | Hocking | B60W 30/02 |
| 2016/0335593 A1* | 11/2016 | Clarke | G06Q 10/0833 |
| 2016/0368396 A1* | 12/2016 | Konet | B60L 15/2045 |
| 2017/0039890 A1* | 2/2017 | Truong | G07C 5/08 |
| 2017/0120903 A1* | 5/2017 | Lavoie | B60W 30/09 |
| 2017/0124509 A1* | 5/2017 | Ding | G06F 16/29 |
| 2017/0220966 A1 | 8/2017 | Wang | |

OTHER PUBLICATIONS

PCT International Search Report and Written Opinion, dated Jan. 16, 2018, Blaine R. Copenheaver, 16 pages.

\* cited by examiner

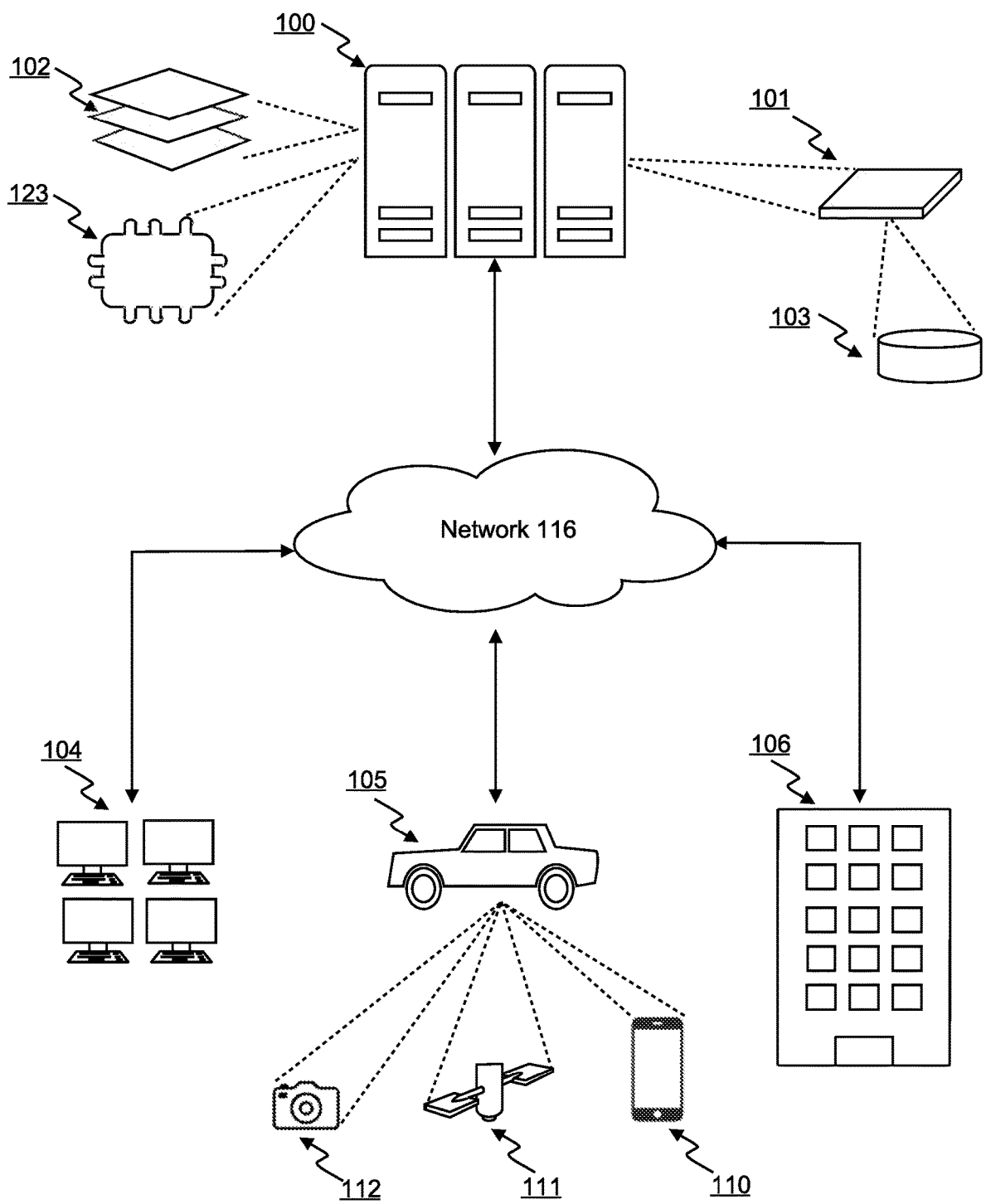

SYSTEM AND METHOD FOR GEO-AWARE TRANSPORTATION BILLING VERIFICATION

CROSS-REFERENCE TO RELATED APPLICATION

The present application is a continuation of and claims priority to co-pending U.S. patent application Ser. No. 15/474,685, filed on Mar. 30, 2017, which claims the benefit of U.S. Provisional Patent Application No. 62/421,086, filed Nov. 11, 2016, the disclosures of which are hereby incorporated by reference herein in their entireties.

TECHNICAL FIELD

The present disclosure relates to transportation and, more specifically, to a geolocation-aware verification system and method for transportation tracking and electronic billing verification related to the provision of transportation services.

DISCUSSION OF THE RELATED ART

The Global Positioning System (GPS) is a satellite-based geolocation system in which a portable device may acquire signals from the GPS satellite constellation and triangulate its position therefrom. The wide-spread availability of GPS technology has led to a wide range of uses, and has revolutionized transportation.

Advances in technology, such as UPS location identification, have led to various innovations in ride-hailing services. However, transportation billing verification, including but not limited to non-emergency medical transportation (NEMT) billing, has not received these same developments, for example, tracking and billing systems that incorporate automated UPS tracking functions for location verification. Non-emergency medical transportation generally relates to transportation services that are medically related, but not acute emergencies. As is the case with other medically necessary services, non-emergency medical transportation is generally billable to a third party such as a medical insurance company, a governmental health care department or agency, or an agent working on behalf of an insurance company or governmental agency.

One technological problem that is associated with electronic transportation billing verification, generally, is that computer programs often reject an input that does not match a designated time or location. These rejections are often arbitrary rejections. To be valid, inputs must be provided using an inflexible syntax, and systems are often too strict in what an acceptable syntax is. This may lead to time-consuming billing disputes of rejections, which may need to be manually addressed by one or more parties.

A second technological problem is that certain programming may make a computing system too broad or permissive in the syntax it might accept, where an actual time or location may deviate unreasonably from the designated time or location. This syntax may relate to location input information, time input information, or, as is often the case, a combination of those two. A computing system that is too permissive in acceptable syntax is counterproductive in terms of the original goal of computer-implemented verification, where the tasks of fraud prevention cannot be fulfilled because of a system that is too permissive in its verification.

A third technological problem is that electronic billing verification systems are unable to self-update in terms of what may be an acceptable input, and the balance between what is too strict and what is too broad for acceptable syntax varies. The parameters that define an acceptable input must be specifically programmed. In essence, existing systems often reject an input value, and have no way of self-correcting in an automated manner; instead, they must be re-programmed each time an update is necessary. Re-programming is time consuming, and might not respond dynamically to service changes and real-world situations. For example, when transporting a patient to a designated location, obstacles such as construction sites or other obstructions may prevent the patient from being delivered to an exact location, where the patient is to receive medically necessary care. As a result, existing electronic billing verification systems may reject otherwise legitimate claims for payment when the actual destination address deviates from the destination address of the medical care, although the drop off location may be the closest possible location the driver is able to get to.

Existing electronic billing verification systems are either too strict, too broad, or not updated frequently enough to allow for transportation service claim acceptance. While transportation billing has largely transitioned to electronic billing verification, the field still faces unique obstacles in its transition to electronic billing verification, and technical advances have largely ignored the problems associated therewith. Technology-based verification features as disclosed herein provide a technological solution to verify that a service request was indeed provided or that a deviation in time or location in a billing request was due to a reasonable or legitimate cause by establishing at "field of acceptability." The field of acceptability provides a balance between too-strict systems and too-permissive systems.

SUMMARY

The summary is not intended to identify or point to essential features or limit the scope of the subject matter claimed herein. The following description includes a computer-implemented system and method for establishing and updating a field of acceptability in verifying a billing request. The system may implement at least one or more servers, one or more geographical information system (GIS), and one or more databases, which are arranged in a network connecting to a driver module, which may include at least a geolocation identifier, a geo-aware camera, and a clock mechanism to identify a current time and date. The system includes a non-transitory computer-readable storage medium that stores instructions to programmatically carry out tasks. Those tasks can be deployed by one or more servers, including receiving a billing request and its related data.

A field of acceptability is established by the system for transport service verification, where predetermined rules govern the parameters of the field of acceptability. At relevant points, it may be determined that a driver is within or not within the field of acceptability. This determination may be used to start the process of determining whether a driver is eligible for payment for services provided in a billing request. If the driver is within the field of acceptability, the generated billing request may be automatically adjusted to match the designated information received so that it may be accepted by the system. If the driver is not within the field of acceptability, he or she may be prompted to submit one or more reasons and/or a photograph enriched with geolocation and time metadata. This information may be used for evidence of legitimate reasons for failing to arrive within the field of acceptability and may be submitted on a user engagement panel. The user engagement panel is a user interface element that may be used as a platform to collect one or more ratings from one or more additional users to participate in verifying the information that the driver submits. A user with firsthand experience could look over the information, including the one or more reasons provided by the driver, and decide to confirm or deny that the driver's reasons were legitimate. This is the process of rating the driver's submission.

The information provided on the user engagement panel that receives a certain number of positive ratings is used to update, correct, and supplement the database dynamically. In addition, the predetermined rules that govern the field of acceptability are in part related to the user engagement panel, where the collected data is used to dynamically update such predetermined rules.

BRIEF DESCRIPTION OF THE DRAWINGS

A more complete appreciation of the present invention and many of the attendant aspects thereof will be readily obtained as the same becomes better understood by reference to the following detailed description when considered in connection with the accompanying drawings, wherein:

FIG. 1A is a schematic diagram illustrating system components in communication with one or more servers for electronic billing verification and driver tracking in accordance with an exemplary embodiment of the present invention;

DETAILED DESCRIPTION

Figure 1B:
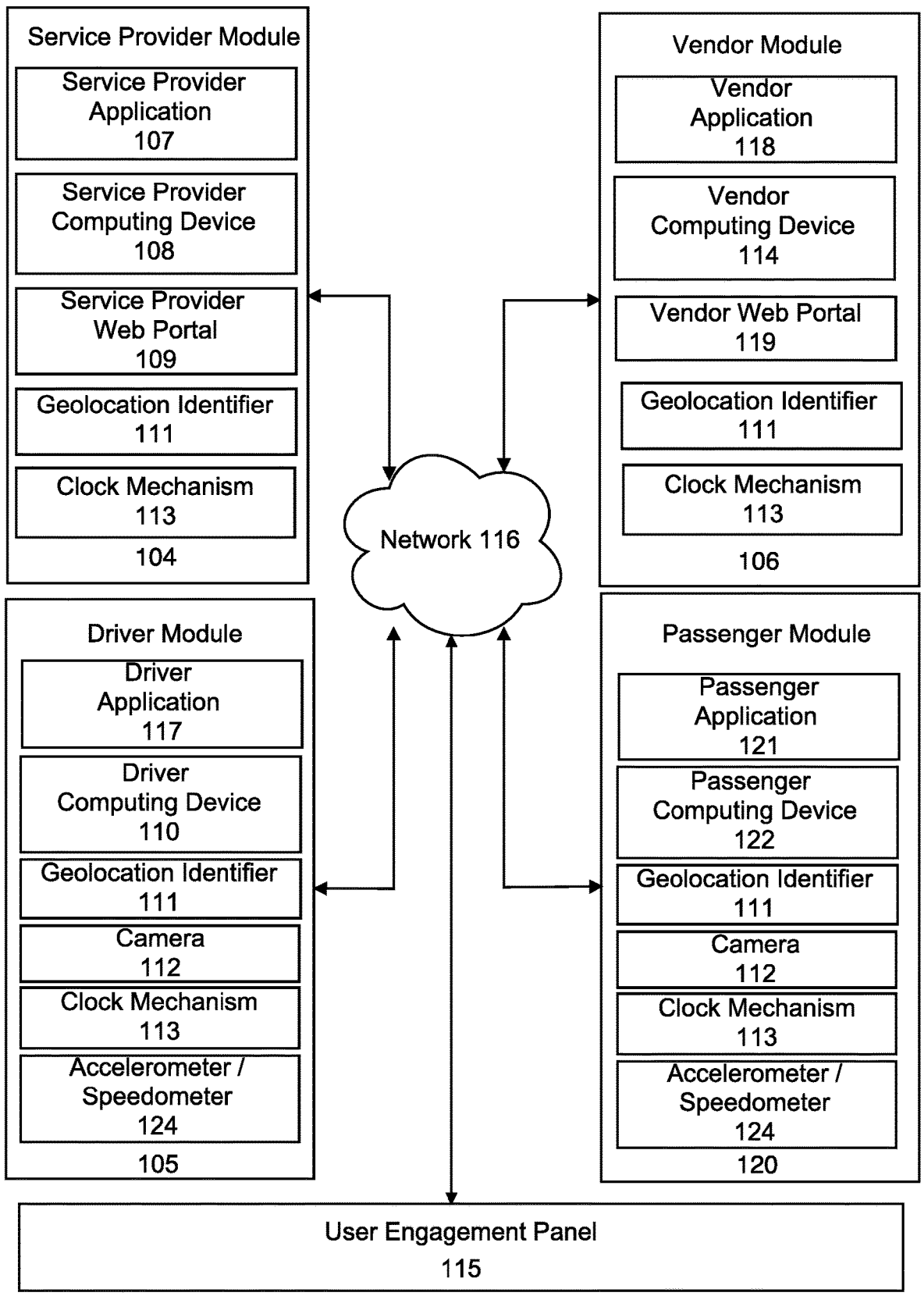
FIG. 1B is a schematic diagram further illustrating system components for electronic billing verification and driver tracking in accordance with an exemplary embodiment of the present invention.

In describing exemplary embodiments of the present invention illustrated in the drawings, specific terminology is employed for sake of clarity. However, the present disclosure is not intended to be limited to the specific terminology so selected, and it is to be understood that each specific element or combination of elements includes all technical equivalents which operate in a similar manner.

It may be appreciated by one of ordinary skill in the art that exemplary embodiments herein additionally support a vehicle-based billing verification computing device for automatically transmitting and/or submitting time-stamped and geolocation-stamped payment requests. Such computing device may include a geolocation identifier unit for acquiring a geolocation of a vehicle, a clock mechanism for acquiring current local time and date information, or an input device for receiving a service request, which may include designated pickup and drop off times and geolocations. A processing unit may automatically generate a billing request for payment including the acquired actual geolocation of the vehicle; the actual date and time information; and potentially information about the service request. A mobile radio or other communications means can transmit the automatically generated billing request.

In the transportation field, including but not limited to the non-emergency medical transportation (NEMT) field, there are at least four parties involved. Generally, the parties involved in the provision of the transportation service itself are, namely, the "driver" and the "passenger," as labeled herein. There are other parties generally involved in coordinating the logistics of the transportation service; herein, those additional parties may be referred to as the "vendor" and the "service provider." The passenger may coordinate with the vendor for requesting transportation service, and the vendor or a vendor's agent may contract with a service provider to provide it. The service provider in turn communicates with a driver to assign transportation service to the driver. In essence, the passenger makes a request by providing the designated location information (e.g. origin or pickup and destination or drop off) and designated time information (e.g. designated pickup time and designated drop off time), and a driver can be dispatched. If the trip the passenger is requesting is authorized, the vendor will contact the service provider with that information.

According to an exemplary embodiment of the present invention, a user may register first with the system before being able to access certain functions. What a user may submit for registration information may depend on the type of that user. For example, a user who is a passenger may provide contact information such as name, address, email, healthcare provider information, or any other relevant information. A user who is a driver may submit relevant licensure information or other qualification information such as a driver's license or service permit, insurance information, and profile information which may include service history and experience, type of vehicle, languages spoken, etc. The relevant licensure information may differ depending on the service provider's place of business. A user who is a service provider may have a dispatch license or other relevant regulatory certification, which may be provided along with other registration information. A user who is a vendor or its agents may submit registration information which establishes that the vendor or its agents are able to disburse payment for service as well as for the vendor's place of business, and verification that the vendor is legally compliant in doing so, as well as handling potentially protected health information of a passenger. It may be understood by one of ordinary skill in the art that "registration information" or "registration data" may reasonably encompass any or all information about various users that establishes a user's legitimacy or ability to use the system and/or provide service in a manner compliant with the law as it applies.

According to an exemplary embodiment of the present invention, a billing request may be sent to the service provider. The service provider may collect a group of billing requests to send to the vendor or its agent. However, in some scenarios it can be contemplated that a billing request may be sent indirectly or directly to a vendor, too. "Indirectly" may mean that the service provider first reviews and accepts it, then submits it to the vendor. "Directly" may mean that it is submitted directly to the vendor. How a driver contacts a service provider or a vendor may depend on an agreement made in advance between the two parties in a service contract or work agreement, etc. It is not intended in description of the present invention that a specific communication framework between the parties is to be established.

One of ordinary skill in the art may appreciate that these parties may be referred to using different terms in exemplary embodiments of the present invention, as those terms are intended to encompass numerous situations. For example, the term "passenger" may refer to a medical patient, while it may also apply to an employee or contractor of a company which has a corporate account, etc. The term "driver" may more broadly refer to any operator of a vehicle, motorized or otherwise, such as a pilot. "Vendor" may encompass governmental and non-governmental organizations, businesses such as private agencies, insurance agencies, corporations, non-profits, privately held companies, or businesses of other structures. The term "vendor" may be understood herein as being a payor for services and not necessarily the person receiving the services. In NEMT, the vendor may be a broker or other third party. The term "vendor" is meant to entail a party who has an interest in accurate, verified billing. Verified billing may be applied in numerous other industries, especially those related to other transportation services or services authentication. For instance, accurate electronic billing verification may be of use in corporate accounts, for car services, paratransit, transit agencies or brokers, taxi-cabs, and the like, where companies or providers may have an interest in making sure that the money they pay for services is being used properly, where they may seek out verifiable information regarding such services. Industries may exist where electronic billing verification systems are of use, which may at least require the use of geolocation and time adjustments, or other embodiments where a field of acceptability relates to other parameters.

Furthermore, "service provider" herein may refer to an entity which provides services by coordinating the services of one or more drivers, while interfacing with vendors. In exemplary embodiments of the present invention, those service providers may be car service companies, such as a car service company which specializes in providing NEMT service. A service provider may have a billing department or individual biller to overlook billing requests from drivers and to bill a vendor for payment. Lastly, "User" herein may relate to a driver, passenger, service provider or a person affiliated with the service provider, or a vendor or a person affiliated with the vendor. "User" is intended herein to refer to a party who might use the system.

It is to be understood that there may be different variables that may relate to the field of acceptability. These variables may be grouped, based on similarity, into different categories. According to an exemplary embodiment of the present invention, one category may apply to one or more fields of acceptability for a pickup in a service request. This may include a pickup time or a pickup location, or both. Another category may apply to drop off, where the drop off category includes a drop off time or a drop off location, or both. The variables may additionally relate to other subjects, where there may be categories that relate to third or fourth categories, where there may be additional legs to a service request. In such a case, a muitileg service request may involve a third category of variables comprising a pickup time, pickup location, drop off time, and drop off location.

According to an exemplary embodiment of the present invention, a field of acceptability may apply to at least one location provided in a service request. For example, there may be one field of acceptability for a specifically designated pickup location of a passenger. However, in another exemplary embodiment of the present invention, a field of acceptability may apply to one or more locations or one or more certain locations. Based on different situations, there may be a field of acceptability which applies to a specific location, where a driver may be required to reach the specific location to be paid for service. However, the field of acceptability may additionally apply to one or more certain locations, where, based on real-time factors such as police activity or road closures, the driver may be paid for service by arriving within or at one of those certain locations to perform service. In essence, a field of acceptability may include one or more locations that are acceptable locations. Further, this may apply to a field of acceptability based on time, where there may be a specific time, a time frame, or certain times that are acceptable for approval of the billing request.

The system may be configured to recognize that "locations" as used herein may apply to geolocations, which might describe a location format that uses latitude and longitude coordinates to describe a location. In addition, "location" herein may also encompass a human-readable format such as an actual address. A geocoding process may be used to translate these formats where it may be relevant. The present description is not intended to limit when or where a field of acceptability may be relevant to a service or a billing request for such service. Whether a field of acceptability applies in certain situations may be based on predetermined rules.

One or more servers may be configured to communicate with one or more modules that track information about vehicle activity, and therefore driver activity, through deriving geolocation data and time data from a geolocation identifier and a clock of a mobile device. In an exemplary embodiment of the present invention, a geolocation identifier such as a OPS receiver may be disposed in a vehicle operated by a driver and may communicate through a wireless network with one or more servers with means for geolocation tracking processing. As a result, one or more servers may receive the inputs for an actual geolocation and an actual time where and when the service request started and ended. Upon geolocation and time data being transmitted, one or more servers can compare the "designated" geolocation to the "actual" geolocation as well as the designated time to the actual time, which establishes whether or not the driver is within one or more fields of acceptability. Herein, "designated" may refer to input received in a service request (e.g. a location entered in as the intended destination of a trip). In contrast, "actual" may denote an input that is tracked through a module or other enabled device (e.g. a location where a drop off may be indicated as having taken place). One or more servers may compare the received actual data from the driver module to the designated information, where an actual geolocation or an actual time are automatically adjusted if they feature a discrepancy but still fall within the field of acceptability during the billing request process. That information and comparison may then be used to confirm with a driver whether transportation services that were supposed to be provided were in fact provided, so that the driver can be paid accordingly (or so it can be determined whether to reject a claim). The driver may then be paid based on a confirmed trip.

According to an exemplary embodiment of the present invention, the determination of whether the driver is within the field of acceptability, and therefore whether the driver is prompted to submit one or more reasons on the user engagement panel, may not solely be based on information retrieved from the driver, the vehicle, or driver module. In fact, this determination may also be from data collected from a passenger or a passenger module, where the passenger's geolocation and verification information such as a signature or a fingerprint are tracked. Relevant verification information may be considered with the actual geolocations or actual times, which may then be compared to the relevant designated geolocations and relevant designated times. In other exemplary embodiments, it is contemplated that the determination of the driver being within the field of acceptability can be based on tracked information from the driver, tracked information from the passenger, or tracked information from both.

Based on billing request information, automatic adjustments can be issued, as mentioned. One or more servers may format billing relevant data once it is received or once determined that a billing request is valid.

Exemplary embodiments of the present invention provide various systems and methods for confirming the bona fide nature of these field of acceptability-based adjustments based on predetermined rules for timeframe(s) and/or distance(s) and/or location(s) by tracking a driver's geolocation and obtaining a timestamp at the time of pickup or drop off to make sure that such pickup or drop off location and timing are within a field of acceptability. The field of acceptability is then further made more accurate by dynamic updates to the predetermined rules which may govern them based on continuous data collection.

According to an exemplary embodiment of the present invention, one or more servers may make an adjustment to the geolocation and/or time relating to pickup and/or drop off. There may be different types of adjustments that are made, based on different situations. According to an exemplary embodiment of the present invention, an "adjustment" may mean that the system may be programmed to select a certain input and display it in place of another, if more than one input is recorded. For example, the system would select the designated geolocation input and display it in place of the actual geolocation input if certain predetermined rules are met (e.g. regarding a field of acceptability). An adjustment may also mean replacing one input with another input. There may be a type of adjustment which may be made automatically; herein an "automatic adjustment" may be referred to when an adjustment is made once a billing request is received by one or more servers in response to the driver being within the field of acceptability. This is an adjustment that takes place when a driver may not have to submit information on the user engagement panel. An adjustment may relate to distance and time, and rules which govern the field of acceptability may be predetermined to reflect any reasonable distance or time. Additionally, it is to be understood herein that an "adjustment" that is made to a billing request does not necessarily mean that a billing request cannot be readjusted later. The geolocations that are adjusted may still be recorded and stored within a database in their initial form, as well as being stored in adjusted form. The same goes for time; while a qualified time may be adjusted, the original input may also be recorded.

In addition, the field of acceptability may have different parameters on a location-to-location basis. For example, the parameters of the field of acceptability may require a larger area in a densely populated urban setting such as Manhattan than in a smaller city, because there may be signal disruption or other technological limitations due to the taller buildings. Local and nearby Wi-Fi connections may be utilized to aid in identifying geolocation, particularly where GPS signals might be inadequate or not accurate enough. Furthermore, cities known for traffic congestion such as Los Angeles may cause a larger field of acceptability for time to be established, as traffic conditions may be much more unpredictable than in a smaller city.

The term "system" herein may refer to the implementation of an electronic billing verification system through a combination of hardware and software operating on one or more modules or on a computing device and may be deployed on one or more servers. The system may include various pre-programmed features combined and integrated with components including but not limited to one or more servers, databases, mobile end applications, web portals, network settings, etc., within a communications framework or network. With the support of these components, services through application interfaces can be realized, such as a website or a mobile application, which can be accessed on certain modules. A module may include a service provider module, a driver module, a vendor module, and a passenger module. According to an exemplary embodiment of the present invention, the system may be implemented through a combination of hardware and software that operates on a computing device, such as portable computing device and computers, generally with one or more connections to a wireless wide area network (WAN) (e.g., the Internet). The system may be configured to communicate with a network service that coordinates service through communication means.

Generally, the processes and methods described herein use one or more computing devices, and those computing devices may be given instructions through software or other instruction means. Those computing devices may be described in the following description of figures in terms of various examples; however, one of ordinary skill in the art may appreciate the differing computing devices potentially used in other exemplary embodiments.

The actions executed by hardware in exemplary embodiments of the present invention may be done programmatically, through computer-executable instructions. The instructions may be stored in one or more servers, on other hardware or system implements, or elsewhere. The actions may be routines or instructions which may detect certain conditions to be met before being executed on a computing device, and they might or might not be automatic. Those routines may also comprise subroutines as necessitated by the goals of such routines, and they may be carried out on hardware devices, software components, or both.

The architecture of the software according to exemplary embodiments of the present invention defines a software structure to meet all of the technical and operational requirements from a usability and functionality standpoint, while still providing optimization manageability and maintenance, performance, security of data, etc. The architecture is, accordingly, configured to keep track of the goals of providing functionality for certain aspects such as user interface (UI) for drivers, passengers, vendors, and service providers, as well as data storage and access. Those structures and their design may vary depending on a wide range of factors and impact the quality, performance, maintainability, and overall usability of a system application.

Structural elements may be defined by the application interface associated with each module, and the collaboration among separate application interface and other components. These structural elements may be grouped into subsystems of the overall system, based on the function of each; the software and software architecture, according to present exemplary embodiments, may respond to according different scenarios. Each user, depending on that user's role and that user's needs, may be provided a different functionality of the system.

One of ordinary skill in the art would appreciate that a client-facing system or sub-system may include a module by which a driver, vendor, service provider, or passenger may access the functionalities necessary to provide or coordinate service requests. These interfaces may differ in organization from each other, as they may be programmed with emphasis on different features. One of ordinary skill in the art would appreciate the differences in the role filled by a driver compared to the role filled by a service provider or vendor, which fundamentally may call for different application interface features and/or module functionalities. These functionalities that are called for may be provided programmatically through software executed on hardware such as a smartphone, smartwatch, or other mobile device and its associated features.

In some exemplary embodiments, a computer enables execution of computer program instructions including multiple programs or threads. The multiple programs or threads may be processed substantially at the same time to enhance utilization of one or more servers and to facilitate substantially simultaneous functions. By way of implementation, any and all methods, program codes, program instructions, and the like described herein may be implemented in one or more threads. The one or more threads can spawn other threads, which can themselves have assigned priorities associated with them. In some exemplary embodiments, a computer can process these threads based on priority or any other order based on instructions provided in the program code. It is to be appreciated by one having ordinary skill in the art that computer program instructions may include computer executable code. A variety of languages for expressing computer program instructions are possible, including but not limited to C, C++, Java, JavaScript, Python, assembly language, Lisp, and so on.

Certain logical functions may be implemented to provide highly specific and tailored services for the technical challenges that must be solved, and may be exceedingly complex to carry out particular if-then scenarios, such as a Boolean logic function. For example, a logical rule may be established to be executed that identifies certain parameters for a field of acceptability; it is in this manner that many complex conditions may be accounted for. Various language features that accommodate complex conditions can be programmed and implemented through programming languages such as Java. Such languages may include assembly languages, hardware description languages, database programming languages, functional programming languages, imperative programming languages, and so on. In some exemplary embodiments, computer program instructions can be stored, compiled, or interpreted to run on a computer, a programmable data processor, a heterogeneous combination of processors or processor architectures, and so on.

Exemplary embodiments of the present invention as described herein are not limited to applications involving conventional computer programs or programmable apparatuses that run them. It is contemplated for other types of computing devices such as a quantum computer, an analog computer, or the like.

Each element in flowchart illustrations may depict a step, or group of steps, of a computer-implemented method. Further, each step may contain one or more sub-steps. For the purpose of illustration, these steps (as well as any and all other steps identified and described) are presented in order. It may be understood that an exemplary embodiment may contain an alternate order of the steps adapted to a particular application of a technique disclosed herein. All such variations and modifications are intended to fall within the scope of this disclosure. The depiction and description of steps in any particular order are not intended to exclude exemplary embodiments having the steps in a different order, unless required by a particular application, explicitly stated, or otherwise clear from the context.

The elements depicted throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

It is to be understood by one of ordinary skill in the art that the hardware of the present invention is not limited to its named parts. In some exemplary embodiments, additional functionalities may be provided by other types of hardware, or additional functionalities may be provided with more efficiency in the future through hardware yet to be available. Tangible hardware components are provided in a specialized arrangement. It is to be understood by one having ordinary skill in the art that the arrangement of such components may depend on the exemplary embodiment. The description of these components herein is not intended to limit the component parts of the system to one and only one arrangement.

In view of the foregoing, it will now be appreciated that elements of the block diagrams and flowchart illustrations support combinations of means for performing the specified functions, combinations of steps for performing the specified functions, program instruction means for performing the specified functions, and so on, whether the steps are performed automatically or not.

FIG. 1A is a schematic diagram illustrating system components in communication with one or more servers 100 for electronic billing verification and driver tracking in accordance with an exemplary embodiment of the present invention. One or more servers 100 may interface with each separate part and functionality of the system, so that it can function in unity. One or more servers 100 allow users to manage and use a complex communication network to grant access to a user or simultaneous system access to numerous users. The system may have more than one server that may be in a distributed structure with support from data centers that may be located anywhere around the world. These implementations may be communicatively linked and cross platform, so that a driver on a computing device may be provided with the information relevant to the service request, such as the electronic map display, indicators which display travel times, routes, pricing information, profile and setting information, other information that is relevant to a vendor, passenger, or service provider, etc. Features of the system can be implemented through computing devices that allow for method steps to be processed and output by one or more servers 100. Server-side architecture may be implemented through a software program configured to coordinate communication between a module and the backend systems that allow for bringing up data and image processing, as well as storage and some calculation features.

One or more servers 100 may deploy a geographical information system (GIS) 102, a non-transitory computer-readable storage medium 101, which may additionally be instantiated as one or more non-transitory computer-readable storage media, and a database 103. A database 103 and its system functions may additionally be instantiated through one or more databases. One or more servers 100 may connect to GIS 102 and non-transitory computer-readable storage medium 101 to provide for system functionalities. The database 103 may be implemented as part of the non-transitory computer-readable storage medium 101, where the data may be stored, organized, and analyzed to obtain information useful for all service requests and billing requests. A person having ordinary skill in the art may also appreciate that one or more servers 100 may contain processing units 123, which can be a type of logic processing unit, such as one or more: central processing units (CPUs); digital signal processors, application-specific integrated circuit, etc. These may be connected through any known system bus structures, including a memory bus with memory controller, a peripheral bus, and a local bus to implement system functionalities.

The non-transitory computer-readable storage medium 101 may additionally store computer-executable instructions, such as program modules, being executed by a computer. The drives and associated computer-readable storage media may provide non-volatile and non-transitory storage of computer readable instructions, data structures, program modules, and other data for the computer system. Program modules may include routines, programs, objects, components, data structures, etc., that perform particular tasks or implement particular data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device.

The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium magnetic tape), preloaded with a computer system (e.g., on system ROM or fixed disk), or distributed from a server or electronic bulletin board over the communication system. It is appreciated that any of the software components may, if desired, be implemented in ROM (read-only memory) form. The software components may, generally, be implemented in hardware.

One or more servers 100 may connect to the service provider module 104, the driver module 105 (e.g., application and features implemented on a mobile device), and the vendor module 106, further details of which are illustrated in FIG. 1B. The connection may be through a communicative means such as a link through a computer network 116, and information may be output to a display of one or more computing devices associated with a module. The communication means of the system may be any means for communicating data over one or more networks or to one or more peripheral devices connected to the system. Appropriate communication means may include, but are not limited to, circuitry and control systems for providing wireless connections, wired connections, cellular connections, data port connections, Bluetooth connections, or any combination thereof. There may be numerous communications means that may be utilized with exemplary embodiments of the present invention.

A user module may be configured differently and each user module may rely on different computing devices constituent parts to carry out specific functions. The different components within the computing device, which in modern times can be in many different forms—tablets, smartphones, wearable technology such as smartwatches, laptops, PCs, or even servers, interact and communicate to share information. Users who use the system may interact with the system through a module, potentially carried out in part on their computing devices through an application. The system may be cross-platform, and it may be accessed through different means, such as web portal and/or mobile applications, at the same time if necessary. For example, the driver module 105 which may use at least a driver computing device 110 such as a smartphone, geolocation identifier 111, and a camera 112. The administration of the system may access various administrative functions through another module different from the ones used by drivers, vendors, service providers, and passengers. It is contemplated in accordance with an exemplary embodiment of the present invention that a system administrator may provide or carry out important administration functions which may be obvious to one of ordinary skill in the art, and may need a module to do so.

FIG. 1B is a schematic diagram further illustrating system components for electronic billing verification and driver tracking in accordance with an exemplary embodiment of the present invention. The service provider module 104 may include a service provider application 107, where the service provider application 107 may be software running on a service provider computing device 108 such as a desktop computer. A service provider (e.g. a human user such as a biller who is employed or affiliated with the service provider) can enter commands and information into the system through the service provider module 104, where the service provider computing device 108 might be a desktop computer or touch screen device or include a keyboard and/or a mouse or other input devices. Other input devices can include a microphone, tablet, smartphone or other mobile device. Additional functionality may be provided through a scanner, etc. These and other input devices are connected to one or more servers through an interface. The service provider application 107 may be in the form of different apps such as desktop app, Android apps, iOS apps, Windows Phone apps, etc. and may run on a computing device, such as a mobile device. The application also may be maintained by maintenance specialists with related monitoring and/or management tools and may be upgraded by engineers with related experience and skills. The server may also allow for a backup on the service provider module 104 for added security. The service provider module 104 in part allows a service provider to connect to a service provider web portal 109, in which certain billing related information such as pending billing requests, service requests, etc. may be made available. According to an exemplary embodiment of the present invention, service providers may be provided features that are unique to their job functions. Service providers may be provided with much more information than drivers to have comprehensive information regarding the services. For example, information provided for a service request may include available vehicles information, the current and future planned locations of the drivers and vehicles, the directions of those vehicles, etc. for any authentication to be done.

The driver module 105 may include a driver application 117, which may be carried out on a driver computing device 110. The driver module 105 allows tracking components such as a geolocation identifier 111 (e.g., GPS receiver) to identify the geolocation of a driver, where the geolocation identifier 111 may be built into a mobile device or it may be part of a specially programmed billing verification device. In other exemplary embodiments, the geolocation identifier 111 may be mounted in a vehicle operated by a driver and may communicate through a network 116 with one or more servers 100 with means for geolocation tracking and/or processing. The driver module 105 may also use a camera 112 to take pictures, and a clock mechanism 113 to obtain timestamps. These may be part of the driver computing device 110, such as built in to a smartphone, or they may be input devices or potentially functionalities provided by an additional specially programmed billing verification device. The camera 112 may allow the driver to take a photo of a certain location (e.g. a drop off location), and that photo may be image processed. The photo may be processing using image-recognition technology to cross-reference the photo with known location images. For example, a patient/passenger who is arriving at the doctor's office for an appointment may be able to take a photo of the entrance into the doctor's office, which may be recognized by the system. The system may have stored images or video recordings of that same building entrance, and that provided photo can be further examined to provide an authentication. Those images or video recordings may be stored within the database 103, which can be queried for its content. In addition, those images may be provided through an API such as the APIs of GOGGLE MAPS, a mapping and turn-by-turn direction application provided by Google, a subsidiary of Alphabet Inc., which feature street images that correspond to correct addresses, which may also be mined for authentication purposes. This functionality may be useful in the case of the driver module 105 having communication problems with one or more servers 100, or problems otherwise maintaining a stable connection. In such a case, this may provide a way to compensate for certain technological failings in connection networks.

The driver application 117 may additionally allow the driver access to a web portal or other means of data input and/or system access. This may be for a driver to submit a billing request, which may go to the service provider. In an exemplary embodiment of the present invention a billing request may go indirectly or directly to a vendor. Indirectly may mean that the service provider first reviews and accepts it, then submits it to the vendor. Directly may mean that it is submitted directly to the vendor. Additionally, a driver may be provided with potential jobs through the driver module 105, where queries can be displayed temporarily for the dispatch of a trip. The driver application 117 may also allow specific communication functionalities with other independent apparatuses within the module or externally with one or more servers 100. Through one or more servers 100 or the user engagement panel 115, a driver may interact with a web portal or a service provider, where it's important that the drivers are able to contact a service provider in the event of a case review, appeal, or other situation.

Further, in the event a passenger cannot sign for a trip, the system may depend on the driver to collect information to confirm or verify the service request, such as a fingerprint, voice confirmation, or verification information from the passenger on the driver module 105. This may be in a case, such as a passenger forgetting his or her module, leaving it at home, technical difficulties, etc. This is not an exhaustive list of the different functionalities the driver module 105 may include, nor is it intended to be such.

The vendor (e.g. paying party) may use the vendor module 106, which is in communication with one or more servers 100, to access the system. The vendor module 106 may include a vendor application 118. The vendor module 106 may also integrate a vendor computing device 114 to implement the vendor application 118. One of ordinary skill in the art may appreciate, however, the vendor application 118 may be programmed to differ from the service provider application 107 or the driver application 117. In addition, a vendor that may be a business might use an internal computing network, where the vendor application 118 may be designed to run on such network and on one or more vendor computing devices 114. The vendor computing device 114 may also give a vendor access to a vendor module 106 through vendor web portal 119. The vendor module 106 may be configured to send a service request to be received at one or more servers 100 or one or more processing units 123. This service request may be then transmitted to the service provider module 104 or the driver module 105.

The passenger may use the passenger module 120 to access certain system functionalities. There may be a passenger application 121 which is run on a passenger computing device 122. The passenger module 120 may also include a geolocation identifier 111, a camera 112, and a clock mechanism 113, among others. According to an exemplary embodiment of the present invention, some functionalities may be achieved by providing a passenger module. The passenger may use the passenger module, which may be in communication with one or more servers while allowing the passenger to contact a relevant vendor or other party. The passenger module may include an application, and the application may be cross-platform to allow the passenger to use the functionalities of a mobile device such as a smartphone, smartwatch, tablet, or other computing devices such as laptops or PCs. The application may also provide the passenger with means to access the passenger module 120, where the passenger may access past route information, profile information, medical information, etc.

It is to be understood that while the service provider module 104, the driver module 105, the vendor module 106, and the passenger module 120 may include similar elements (such as a specific application, or may contain elements such as a geolocation identifier 111, camera 112, clock mechanism 113, etc.), these elements need not be identically implemented within each module. A geolocation identifier 111 and a clock mechanism 113 may be used to, respectively, ascertain the location of system activity, in addition to obtaining a timestamp for that system activity on a service provider module 104, a vendor module 106, a passenger module 120, or a driver module 105. This may be of use in potential audits or as a security measure in some cases, especially if either module is being used on a mobile computing device.

One or more servers 100 may also provide access to a user engagement panel 115, which may be accessed by a user through one or more modules connecting to the user engagement panel 115 through a network 116. The user engagement panel 115 may be a user interface (UI) element. One or more servers 100 may access the database 103 or one or more databases and display relevant data within it on the user engagement panel 115. One or more servers 100 may access all information regarding a certain service request or billing request and display it. The user engagement panel 115 may be provided through such means as an online forum, message board, or other type of website that allows for the online discussion of relevant topics. The user engagement panel 115 may be accessed on a web browser or provided as part of a user's application or as its own application that can be run on one or more computing devices. The data on the user engagement panel 115 may be accessed generally, though it potentially may be redacted for private information depending on who may be viewing it. In other instances, it may be presented in whole to certain users, such as the user the information regards.

A driver may access the user engagement panel 115 through the driver module 105, where the driver can upload a photograph, submit the reasons he or she was not within the field of acceptability, etc. On the user engagement panel 115, photographs that a driver has uploaded may be displayed, and those photographs may include metadata with geotag information or a time stamp associated with the time the photograph was taken.

The user engagement panel 115 can also be accessed through the service provider module 104 and the vendor module 106, where a user may access information for verification. From the user engagement panel 115, an authorized biller that may be a service provider or a vendor may review case facts and other information, and may be able to contact one or more drivers to verify the billing request.

According to an exemplary embodiment of the present invention, a driver might be notified to make a submission including billing relevant data on the relevant user engagement panel 115. The data that is collected through the user engagement panel submissions from one or more drivers can be used to dynamically update, correct, and supplement the database 103. When billing relevant data is submitted on the one or more user engagement panels 115 and receives a predetermined number of positive ratings or is verified according to other predetermined rules, it may be used in real time to update the database 103. In turn, an update to the database 103 may cause an update to one or more fields of acceptability where relevant. In this manner, a field of acceptability is also dynamically updated and incorporated into the database 103 correspondingly. Based on one or more user engagement panel submissions, it may be determined in part whether a field of acceptability is accurate, and whether it should be kept active, deactivated, or incorporated as a semi-active field of acceptability, as further defined in FIGS. 3B and 3C. Any user with firsthand experience of the billing relevant information, geolocation, or time, whether it be a service provider, driver, vendor, passenger, or another individual registered within the system, may contribute to the data of the user engagement panel 115. Firsthand experience may be determined at least by geolocation tracking data, where firsthand experience is determined by a user being indicated as physically proximate to a relevant location. A relevant location in some instances may be an actual geolocation under question in a billing request. Proximity may be defined, in an example, as less than 50 feet from a location, or it may be a different definition based on predetermined rules such as 30 or 40 feet. If the user is within a radius based on geolocation data, he or she is indicated to have firsthand experience and is thus qualified to at least rate information on the user engagement panel. In exemplary embodiments of the present invention, proximity determinations might not be based on a radius; they may be based on being on the same city block or street, or based on a geo-fence. These may be predetermined or established at any time. The crowdsourced data or information may or may not be made generally available to other users of the system. If any crowdsourced data or information is identified to be helpful, either through informing other users or by receiving a predetermined number of positive ratings, then a reward may be given to the user who submitted it. This may provide an incentive for users to use and make submissions on the user engagement panel 115. It is to be understood by one of ordinary skill in the art that system features may be disposed on other implements not shown or defined by this or other schematic diagrams.

According to an exemplary embodiment of the present invention, the user engagement panel 115 may be organized in one or more different manners. There may be one or more user engagement panels, where every field of acceptability has its own corresponding user engagement panel 115. In addition, one user engagement panel 115 may have its own data storage means, where one or more databases may store corresponding information for all relevant data for one or more locations related to one or more service requests. In addition, there may be a central user engagement panel with one or more subsections which apply to a single field of acceptability or multiple fields of acceptability at once.

Figure 2A:
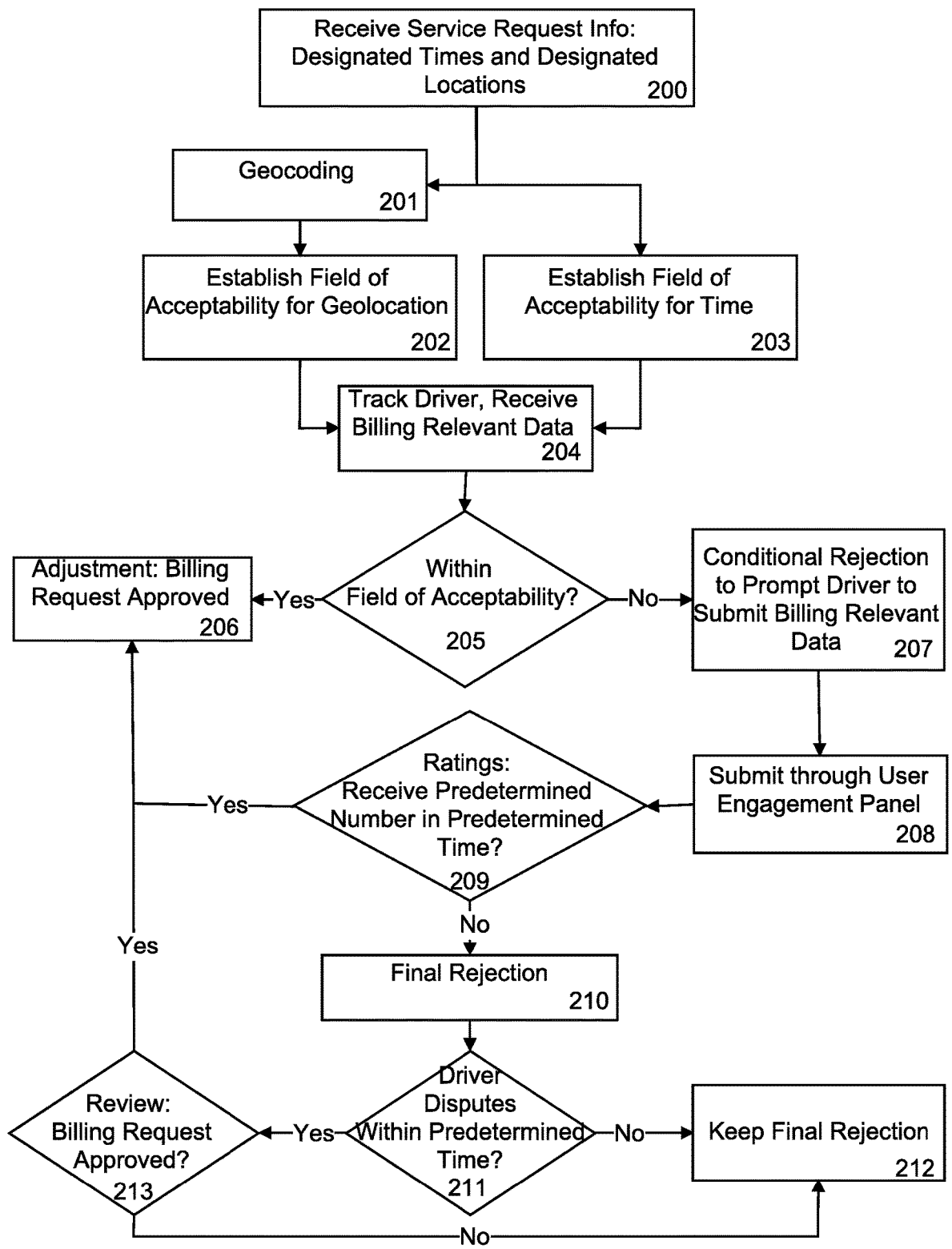
FIG. 2A is a flowchart illustrating an exemplary workflow for making a billing request adjustment in the provision of service in accordance with an exemplary embodiment of the present invention.

FIG. 2A is a flowchart illustrating an exemplary workflow for making a billing request adjustment in the provision of service in accordance with an exemplary embodiment of the present invention. The first step in the process is to receive the service request information (step 200), which may include designated locations and designated times related to the service request. This may also include vendor information such as certain field of acceptability stipulations individual vendors may have. The GIS 102 or one or more servers 100 may implement geoprocessing (step 201), including geocoding location input as an address into a geolocation including, for example, longitude and latitude coordinates. This may be achieved using a third-party geocoding API such as GOOGLE MAPS. Based in part on the information submitted in a service request, one or more servers 100 can then establish a field of acceptability, which may be based on dynamically adjusted predetermined rules, using values input in the service request. Geocoding in part allows for the field of acceptability for geolocation to be established (step 202), by turning a location into a geolocation. In addition, the field of acceptability for time can be established (step 203) based in part on the service request input. Once one or both or any other relevant field of acceptability has been established and the service request is underway, the system may track the location of the driver over time, and may receive the billing relevant data (step 204), where the driver module 105 transmits the billing request information to one or more servers 100 about the location of the driver module 105, through functionalities such as a UPS receiver. Billing relevant data may be transmitted or otherwise received periodically upon the occurrence of an event (e.g., the vehicle stopping for a certain amount of time, or stopping within a certain distance of a designated location), or upon an information request (e.g., a service provider, vendor, or other system monitor requesting a status update on a vehicle manually).

Based on the service request information and billing relevant data, including the actual pickup geolocation and time, the actual drop off geolocation and time, and other relevant information such as pricing information and mileage information etc., it is then determined if the driver is within the field of acceptability (decision 205) for the submission of a billing request. This may occur after the driver module automatically relays billing request information to one or more servers 100. If the tracked information is within the field of acceptability or matches the service request information, then an automatic adjustment may be made: the billing request is approved (step 206). The information about the adjustment, such as what values were changed and when those changes were made, may be recorded in the system. The records may contain a full accounting of this and other similar information for a service request and billing request. If a driver is not within the field of acceptability, then the reasons for that happening may have to be looked into, in which case one or more servers 100 may alert the driver through one or more messages through the driver module 105 that he or she may be out of the field of acceptability. As previously mentioned, the determination may be based on information collected from a passenger, where the information collected from the passenger may be used with the driver module information or used on its own. In a situation in which the driver is not within one or more fields of acceptability, a conditional rejection or final rejection which may ultimately lead to a temporary or permanent cancellation of payment. In this situation, whether or not the service request was carried out may be verified. To do so, one or more servers 100 may send a message to a driver when a failure to arrive within a field of acceptability occurs. This may be considered a conditional rejection. This message may prompt the driver to provide one or more reasons and photo(s) for failing to be within the field of acceptability (step 207). This may be a description of what kept the driver from arriving at the designated time or designated location or a photograph enriched with time and geolocation data as proof. The driver then submits this billing relevant data through the user engagement panel 115 (step 208). For review, a user could look over the billing relevant data, including the one or more reasons provided by the driver, and decide to confirm or deny that the driver's reasons were legitimate. This may be an example of a process of rating the driver's submission. These reasons may be investigated by a user, including one or more other drivers, so that it can be determined what problem occurred, and whether that problem was a legitimate, where the problem could be an honest mistake, potentially fraudulent, or cannot be determined. In addition, in some situations the driver may collect a signature or other confirmation such as a fingerprint from the passenger that the service request was attempted and could not be completed as designated, and the driver may take a photograph and upload it with a written explanation of the situation (e.g. "There was a parade route, 5th Avenue blocked from access—dropped passenger off on 6th Avenue"). A passenger verification may take place at the beginning of service, during service, or at the end of service. This may be collected on the driver module 105, on a special purpose device, or even a module that is specifically provided for the passenger.

When the billing relevant data is submitted on the user engagement panel 115, one or more additional users with firsthand experience may rate it. If the billing relevant data receives a predetermined number of ratings within a predetermined time (decision 209), then there may be an adjustment (e.g. payment), where the billing request may be approved (step 206), because the ratings have proven it to be accurate. Those ratings may be positive ratings or ratings of confirmation, or any other rating type that conveys the information that the one or more reasons are legitimate reasons. They may also be negative ratings. If the information does not reach the predetermined number of ratings within the predetermined time (decision 209), a final rejection (step 210) may be issued. If the driver does not think the claim is legitimate or does not dispute within a predetermined time (decision 211), a final rejection may be kept (step 212). If the driver believes his or her claim is legitimate, and indicates that within a predetermined time (decision 211), then a service provider may open a case review. In a case review, the service provider may overlook the reasons, the photograph, or other information the driver submitted. The service provider may be provided the same information or more detailed information than what has been provided on the user engagement panel 115. If the service provider, or a vendor in certain exemplary embodiments of the present invention, does not think that the driver's claim is legitimate and does approve of a billing request (decision 213), then the service provider may keep the rejection final (step 212). If the service provider decides to approve a billing request (decision 213), as there may be many legitimate reasons for a driver to be unable to arrive at the right location, then an adjustment is made because the billing request has been approved (step 206). Factors may include parking restrictions, road rules, constructions sites, and temporary road blocks. In some cases, it may simply not be safe for a passenger to disembark the vehicle, where the driver assesses that it may be safer to pull over to a nearby location. Road closures for special security events, parades, rallies, or protests may also make it impractical or impossible to arrive at the right location. All these may be potential reasons a driver can have a location or time discrepancy verified.

Figure 2B:
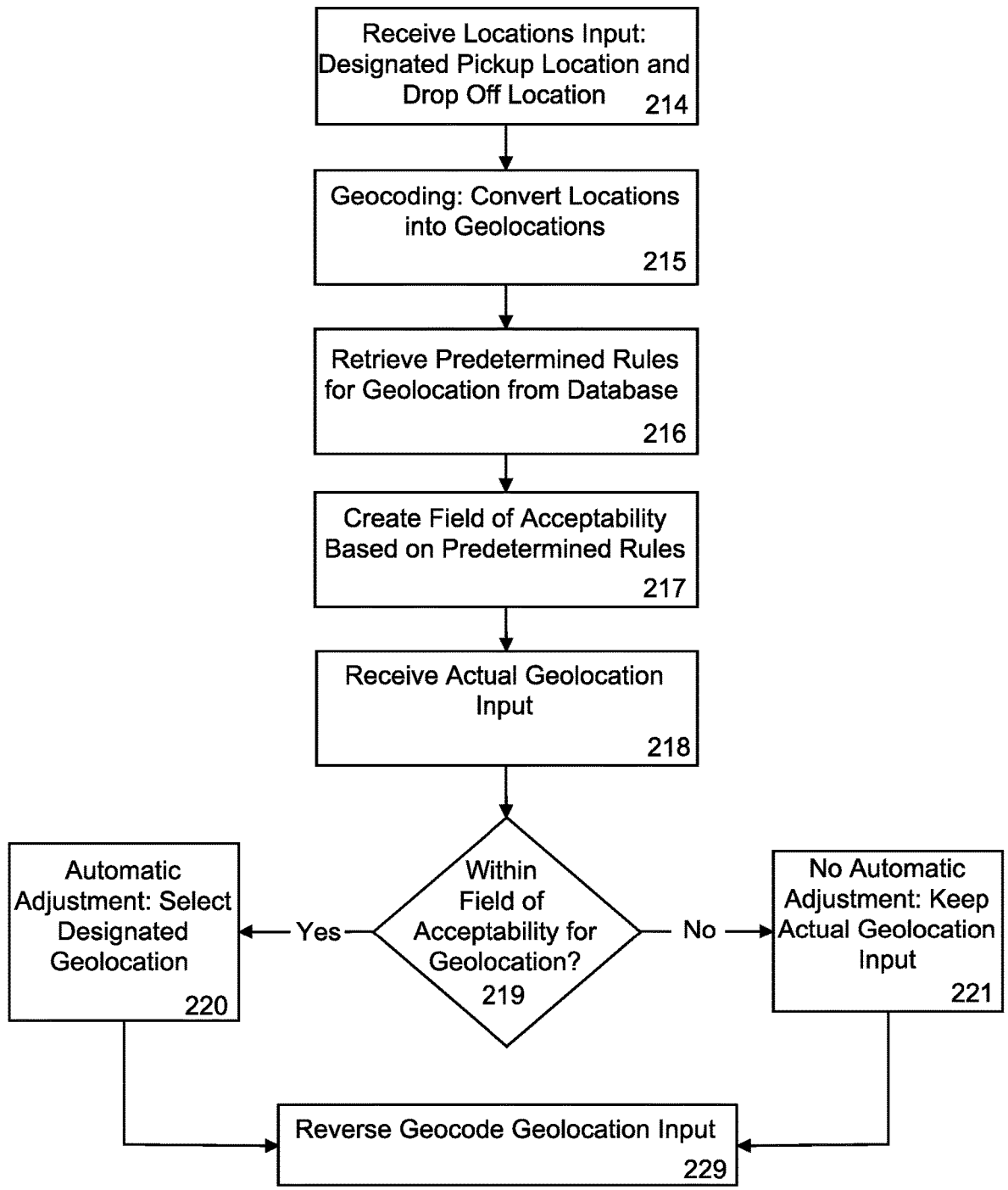
FIG. 2B is a flowchart illustrating an approach for adjusting a billing request in regards to geolocation in accordance with an exemplary embodiment of the present invention.

FIG. 2B is a flowchart illustrating an exemplary workflow in accordance with an exemplary embodiment of the present invention, where the steps of adjusting a billing request in regards to geolocation are shown. One or more servers 100 receive locations input that may contain the designated pickup and drop off locations (step 214), or multiple pickup locations and drop off locations in some exemplary embodiments. Those locations are then geocoded, where the input locations are turned into geolocations (step 215). The geolocation may be used to retrieve the predetermined rules associated with that geolocation from the database 103 (step 216) (e.g., a geolocation where the predetermined rules for the field of acceptability are retrieved, and it is determined the field of acceptability must be based on an area within 120 feet of the designated geolocation).

Those predetermined rules create the dimensions of a "buffer parameter" which allow the GIS 102 such as Arc-GIS, a mapping platform provided by Esri, which provides spatial analysis software, and/or one or more servers 100 to create the field of acceptability. The buffer may establish the field of acceptability by establishing an area which includes all points that qualify as acceptable based on the predetermined rules (step 217). With spatial analysis software, certain coordinates with certain attributes may be grouped together within a buffer. The buffer may be based on a central set of coordinates translated from an input service request address during geoprocessing. The buffer then is configured to contain all coordinates which are within a certain distance of the center point as its parameters. The coordinates associated with the geolocations all meet certain criteria, and therefore may be grouped based on that similarity.

Once the field of acceptability has been established, an actual geolocation input from the billing request generated by the driver module 105 may be received by one or more servers 100 (step 218). Based on the input, it can be determined whether the actual geolocation is within the field of acceptability (decision 219), and is therefore a "qualified geolocation." If so, an automatic adjustment for geolocation may be issued (step 220), where the designated location input is selected for purposes of processing the billing request. For example: the field of acceptability established based on a predetermined rule which calls for a size of 200 feet, where the center coordinates for the field of acceptability are based on the designated geolocation of 40° 45'23.2"N, 73° 58'35.8"W. If the driver were to drop off a passenger at 40° 45'23.6"N, 73° 58'35.0"W, which is 105 feet away from the designated drop off location, the one or more servers 100 may automatically select the designated input for drop off geolocation, which is 40° 45'23.2"N, 73° 58'35.8"W, rather than the actual input for drop off. In other exemplary embodiments, the field of acceptability may be based on a programmed "snap tolerance," such as in a GIS 102, where locations may be "snapped" into groups on a map. The determination of whether the geolocation is within the field of acceptability may, in addition to a coordinate-based analysis, be done by determining a distance between two input points, such as feet, meters, or other measurement. In some exemplary embodiments, geolocations can be geocoded back into human-readable addresses (step 229).

If the actual geolocation is not in the field of acceptability, no automatic adjustment for geolocation will be issued (step 221); however, the system may still record and store the actual geolocation input in the database 103. Geolocation input may be geoprocessed back into a human readable address (step 229). Thus, the actual geolocation may be geoprocessed back into the actual location.

Figure 2C:
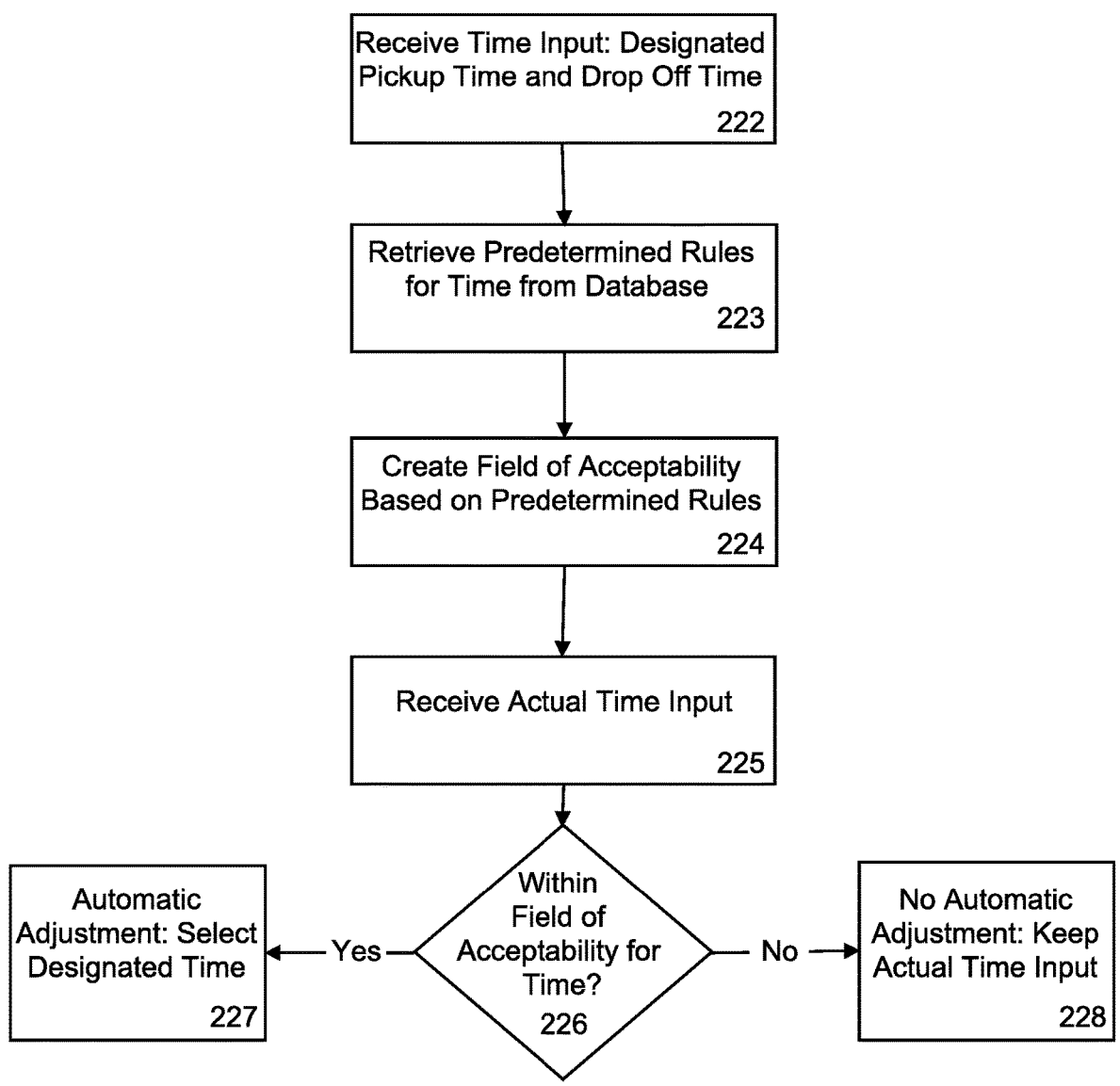
FIG. 2C is a flowchart illustrating an approach for adjusting a billing request in regards to time in accordance with an exemplary embodiment of the present invention.

FIG. 2C is a flowchart illustrating an exemplary workflow in accordance with an exemplary embodiment of the present invention, where the steps of adjusting a billing request in regards to time are shown. Once a service request has been submitted by a vendor or other relevant party, the designated pickup and drop off time input are received (step 222) by one or more servers 100. Based on the service request, it may be determined if there are predetermined rules for the field of acceptability based on time by retrieving such information from the database 103 (step 223). This may be performed by referencing a unique ID number or by another service request identifier that can be used to query the database 103 for the relevant information. Once the designated pickup time and drop off time and the predetermined rules regarding the field of acceptability based on time for a service request are retrieved, the field of acceptability based on those predetermined rules may be established (step 224). The field of acceptability based on time may cause times to be grouped by attribute; in that case, the defined attribute may be based on a predetermined time or other temporal constraint. Next, the service request can be carried out, and the actual time input in a billing request can be received from the driver module 105 (step 225). Based on the actual time received, it can be determined whether the driver is within the field of acceptability for time (decision 226). The designated time will be a known time value, used as a point of comparison to the actual time, where the rule may dictate that any time outside of a time window will not be a qualified time, and therefore rejected. The rule may dictate what is a qualified time, such as any time input that is within 10 minutes of the designated time. For example, the designated time is 9:15 AM, and a rule dictates that only times within 10 minutes are a qualified time, then one or more servers 100 or other means of processing may accept any time input between 9:05 AM and 9:25 AM. In other exemplary embodiments, the field of acceptability for time may be created by a rule which makes a qualified time 5 minutes before the designated time while simultaneously creating a field of acceptability that is 10 minutes after. This may mean that a qualified time in this exemplary embodiment may be, for a designated time of 9:15 AM, between 9:10 AM and 9:25 AM. A comparison may be made on the basis of a logical function that creates a timeframe, which may be provided and written through a programming language to be carried out by a computing device. If the time input is within the field of acceptability, an automatic adjustment for time input may be issued (step 227), where the designated geolocation input is selected for purposes of processing the billing request. Adjusting a billing request in regards to time may be done programmatically according to a rule, or it may be adjusted programmatically or manually after review by a service provider. If the time is not a qualified time, no automatic adjustment for time will be issued (step 228 however, the actual time input may still be recorded in the database 103.

It is to be understood that FIG. 2B and FIG. 2C may be instantiated as subroutines which are intended to describe more specific steps regarding establishing the fields of acceptability as mentioned in FIG. 2A, rather than figures that establish the only process by which one or more fields of acceptability may be established. The predetermined rules that define the field of acceptability may be subject to variation. The field of acceptability may relate to the driver reaching a certain speed, averaging a certain speed, traveling a certain total distance, traveling along a certain route, obeying traffic rules, maintaining a safe following distance, etc. The predetermined rules may also be subject to change based on collected data, which in some exemplary embodiments may be analyzed by artificial intelligence (AI). AI may determine patterns which may subject the field of acceptability to change in certain conditions. For example, weather conditions may affect the ability of drivers to arrive at some locations, or may increase traffic congestion. In such situations and where it is relevant, AI may change the field of acceptability based on predetermined rules. It is to be understood by one of ordinary skill in the art that an approach to changing the field of acceptability based on data collection may be applied to numerous other factors not limited to weather conditions. Furthermore, the field of acceptability based on distance does not need to be based on a certain radius. In another exemplary embodiment, the field of acceptability based on distance may be a geo-fenced area with multiple sides of varying length, height, or any other dimension or parameter. It is to be appreciated by one of ordinary skill in the art that in some exemplary embodiments that this may also be accomplished through updating the field of acceptability.

However, to qualify to be paid in a billing request, the driver meets all or a certain number of variables. For example, to qualify for payment, the driver provides service as requested, or otherwise has the billing request variables adjusted whether through automatic adjustment, adjustment through the user engagement panel, or adjustment made on a dispute. However, there may be cases where an adjustment is not made to one or more variables, though the driver still provided the service request. For example, if the driver did not have legitimate reasons for picking the passenger up at a location different from the designated pickup location, but still got the passenger to the correct destination at the correct time. In this case, the one or more reasons for the driver not making a pickup at the correct location may be collected and analyzed, but since the service request was still provided and the billing request submitted, the driver may be paid. This payment may be in full, in part, or not at all, as there are numerous situations in determining payment that may be best carried out at the discretion of a service provider, one or more additional users, a vendor, or the system. In other exemplary embodiments, paying a driver the correct amount for a billing request in some situations might not be based on a discretionary determination.

Situations may arise in which a driver or a passenger does not participate as expected, or where one party is unable to locate the other such as an absence (e.g. a no-show). If the driver does not show up, then no service has been provided, and there might be no billing request generated. If the passenger does not show up, there may be no verification from the passenger. There may also be situations when the driver or passenger cancels the service request before or during the service. There may be programmed work-arounds for such situations, which may be verified if certain verification factors are met. One such verification factor may include tracked geolocation and time information, and the determination of whether the driver is within a field of acceptability, where the field of acceptability in such a case may relate to time, geolocation, or time and geolocation. For example, meeting a verification factor requirement may involve a driver arriving at a certain geolocation and staying there for a certain duration of time, such as 10 or 15 minutes or another predetermined time. If the driver is unable to find parking during that time due to a parking regulation, he or she may circle the block or wait at another nearby location, and this may be considered wait time if appropriate. Another verification factor may relate to an effort to contact the other party. For a passenger, that may be one or more attempts to reach the vendor, service provider, or driver, as relevant. For a driver, that may be one or more attempts to contact the passenger, vendor, or service provider, as relevant. There may be a text entry field provided on a mobile device in order for the driver or passenger to register information regarding the other party not showing up, which may be submitted through the user engagement panel 115 or included in a billing request. In the event the passenger does show up, but is late, a payment additional fees to the driver for the additional time he or she has spent waiting for the passenger may be considered but be based on where and for how long the driver was waiting, if he or she made any attempts to contact the passenger based on a phone record, etc., which may be integrated into the system using relevant user modules or communication means.

A no-show situation or a similar type of situation might or might not be related to the field of acceptability; however, the passenger module 120, the driver module 105, the service provider module 104, or the vendor module 106 may implement features to account for numerous situations which may arise, such as the service provider entering in certain clarifying information, etc. If the passenger doesn't show up, a driver can still submit a billing request manually or automatically (e.g. at expiry of a timer programmed to start upon arrival, which might or might not terminate at indication of the driver picking up the passenger). A driver may still have a billing request adjusted through the user engagement panel 115 if the driver does not arrive within a field of acceptability; the one or more reasons may be verified even without passenger verifications in some situations; means for processing a billing request that is input without providing passenger verification information may be provided, and whether that is approved or rejected may be based on predetermined rules.

Figure 3A:
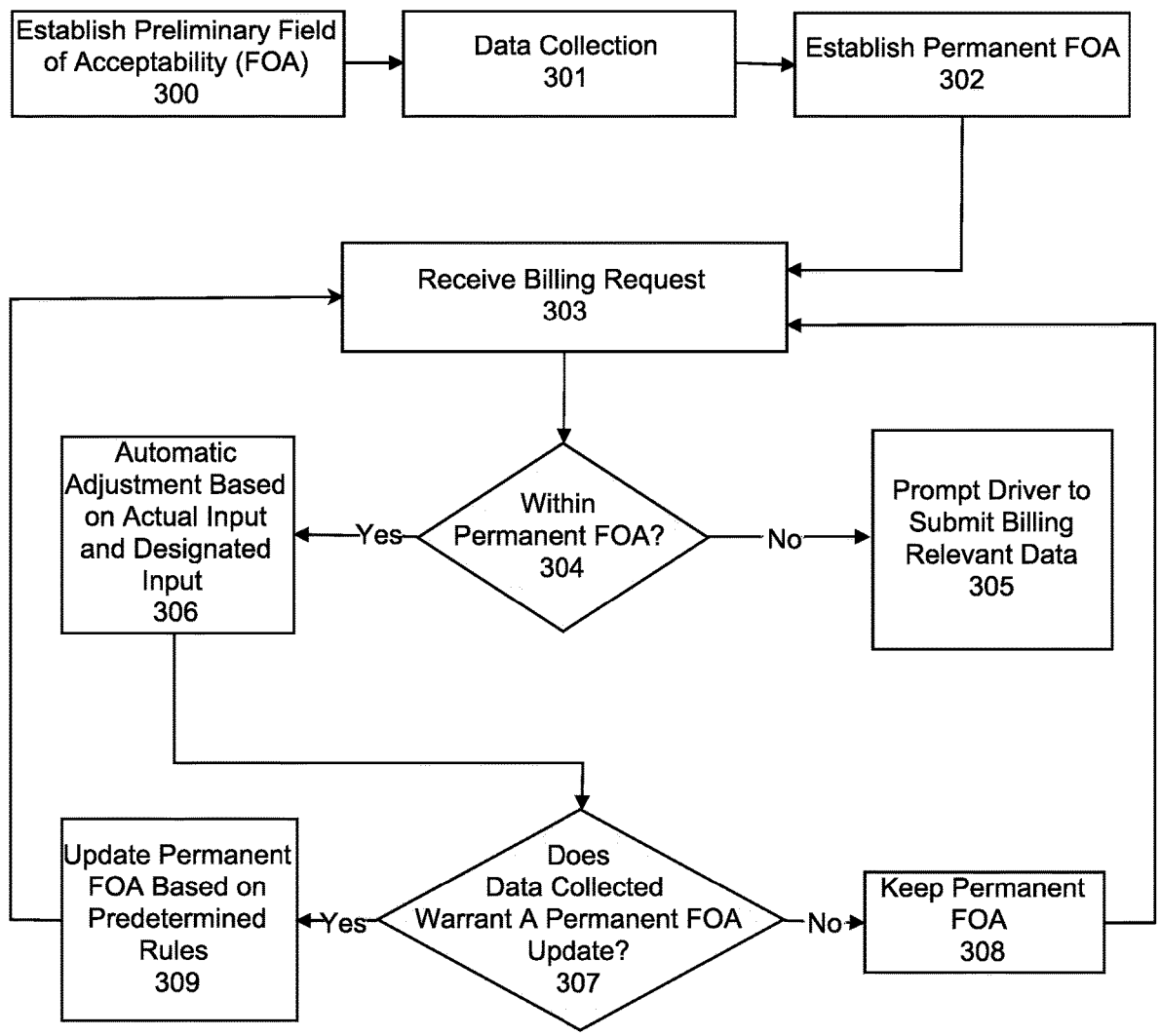
FIG. 3A is a flowchart illustrating an approach for establishing and updating the field of acceptability in accordance with an exemplary embodiment of the present invention.

FIG. 3A is a flowchart illustrating an approach for establishing and updating the field of acceptability in accordance with an exemplary embodiment of the present invention. It is important to note that it is the party that bears a responsibility to pay for provided services that is the one with authority to establish a field of acceptability. Thus, the field of acceptability might not be established by a driver or a passenger as a general rule in an exemplary embodiment of the present invention. Although a service provider may not have that authority either, in some circumstances the service provider may engage in negotiation of the field of acceptability with the vendor or the agent, especially if there are some special rules which apply to the provision of services.

The method of establishing a field of acceptability may include different stages where the field of acceptability differs in its parameters. In an exemplary embodiment of the present invention, there may be at least three "types" of fields of acceptability. The field of acceptability may be first established as a "preliminary" field of acceptability based on a vendor's or agent's discretion or common sense, i.e. arbitrarily, or otherwise based on historical data, if available. A preliminary field of acceptability may be established based on default parameters (step 300), and those may be predefined by a vendor, a vendor's agent, or another relevant party. Default parameters may be arbitrary by their nature, and may be updated in response to how transportation services are being provided. There may be data collection (step 301), where a predetermined number of service requests (a certain number of drop offs, pickups, or a combination of those, etc.) may be recorded. In this phase, the user engagement panel may be used to collect information or data which may help in eventually transforming a preliminary field of acceptability to a more accurate permanent field of acceptability. Data collection may help establish a more accurate permanent field of acceptability, and the collection process may take place for any length of time, as necessary. Data collected may be stored in the database 103. However, "permanent" herein as it may apply to a field of acceptability does not indicate that a permanent field of acceptability cannot or will not be changed; herein, the term is used to reflect that a permanent field of acceptability may be considered a field of acceptability that may be applicable over a longer period of time. There may be circumstances where the permanent field of acceptability is subject to change based on collected data or reset, such as a permanent street closure or change in parking rules or regulations.

According to an exemplary embodiment of the present invention, the billing relevant data, including but not limited to actual pickup and drop off locations, is collected continuously. If the number of adjusted billing requests supported by the same type of legitimate reasons reaches a predetermined number, the preliminary field of acceptability is deactivated and transformed to a permanent field of acceptability. Generally, if the data collection shows that drivers repeatedly arrive outside the preliminary field of acceptability, the preliminary field of acceptability is deactivated and transformed into a larger permanent field of acceptability based on relevant data collected. If, on the opposite, the data collection shows that drivers repeatedly arrive closer to the designated location than the maximum established by the preliminary field of acceptability, the preliminary field of acceptability is transformed deactivated and transformed into a smaller permanent field of acceptability. Based on data gathered during data collection, the permanent field of acceptability is established (step 302) based on the data collected in the data collection phase, and is a more accurate reflection of when or where drivers may be making drop offs or pickups in the actual provision of service. But since real-life situations affect the provision of those services, the field of acceptability may need to be updated.

According to an exemplary embodiment of the present invention, a billing request may be received (step 303). Based on the billing request, it is determined if the driver is within the permanent field of acceptability (decision 304). If the driver is not within the permanent field of acceptability, a conditional rejection may be issued and the driver may be prompted to submit billing relevant data in the form of one or more reasons or photographs through a user-engagement panel for failing to arrive within the preliminary (step 305). As disclosed in FIG. 2A, the driver's billing request may be subject to a full or conditional rejection, depending on the circumstances. Once submitted through the user engagement panel, the billing relevant data submitted by the driver is subject to ratings. If ratings reach a predetermined number within a predetermined time, there may be an adjustment made to the driver's billing request. If not, the driver's billing request is rejected. However, the driver still has a chance to dispute the rejection within a predetermined time.

If the driver is within the permanent field of acceptability, there may be an adjustment made to the driver's billing request based on the actual input and the designated input (step 306). Billing request data may be collected, and responsive to where drivers are arriving within the permanent field of acceptability, it may be changed in size if it is broader than it needs to be. On the other hand, if the permanent field of acceptability is too strict, then the rules that establish it may be updated as well, where the permanent field of acceptability may become larger. Based on predetermined rules, it may be determined whether the data collected warrants an update to the permanent field of acceptability (decision 307). This may be determined by evaluating whether actual input (e.g., for actual geolocation or actual time) is more accurate than the maximum allowable input. In an example for geolocation, if there is a designated geolocation, and the field of acceptability accepts an input within 100 feet, 100 feet is the "maximum allowable input." If a drop off happens at 25 feet from the designated location, that is closer to the designated location than 100 feet; this may be evidence that the field of acceptability is too permissive, if the actual input is not substantially different, the data collected does not warrant an update to the permanent field of acceptability (step 308). If the data collected does warrant an update to the permanent field of acceptability, this may cause an update to the permanent field of acceptability based on predetermined rules (step 309). The update may tailor the field of acceptability to the relevant size based on the billing relevant data (e.g., the field of acceptability may be made smaller or expanded to be more permissive).

It is to be understood by one of ordinary skill in the art that according to exemplary embodiments of the present invention, it is possible that only one field of acceptability might be fully active at given time. Also, exemplary embodiments of the present invention provide for issuing an alert to the driver to notify the driver of being within the field of acceptability and can therefore perform pickup/drop off. If the driver receives an alert notifying the driver of being outside the field of acceptability and needs to proceed closer to the designated location, the driver may do so to receive an automatic adjustment for his/her billing request.

Figure 3B:
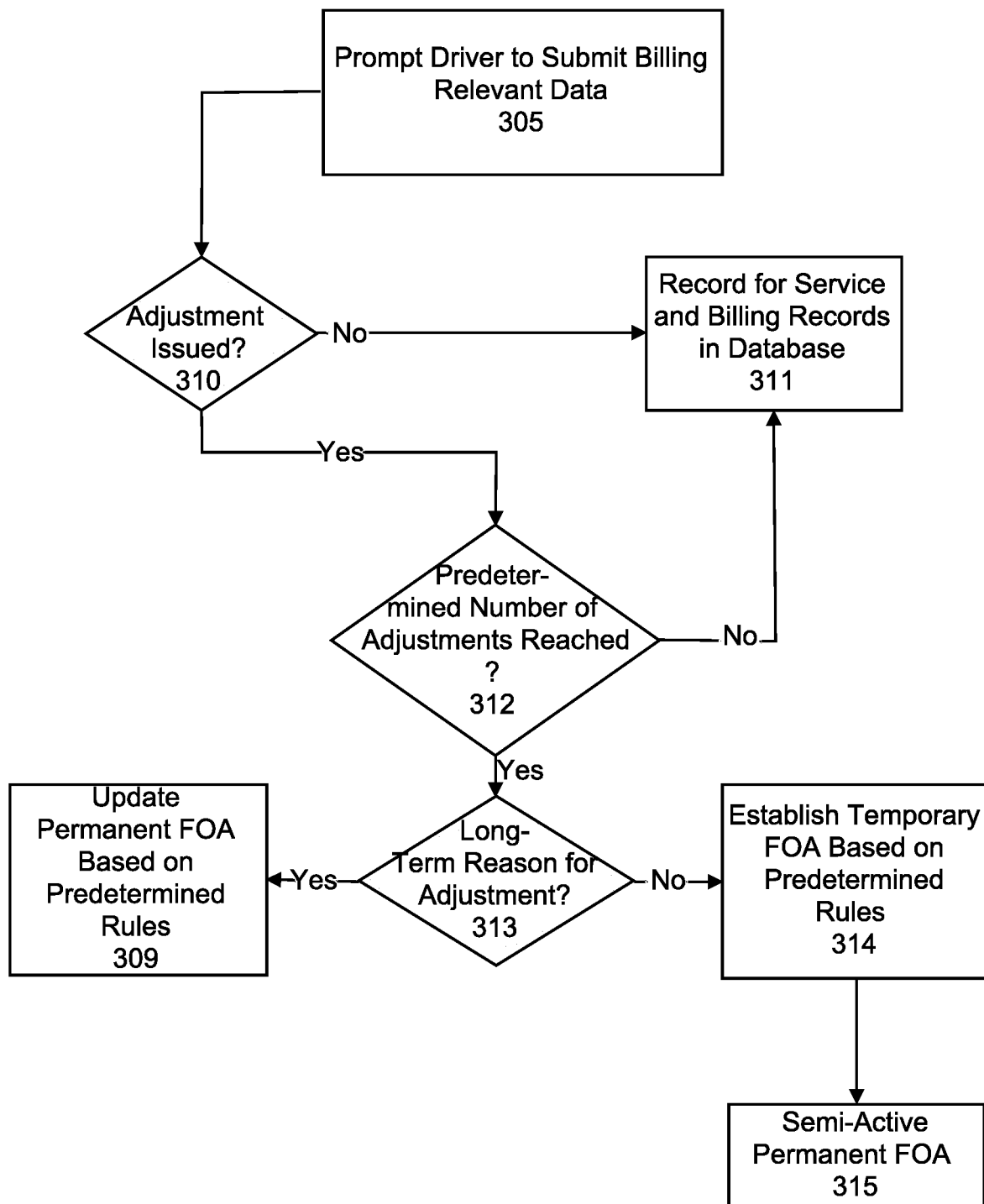
FIG. 3B is a flowchart illustrating an approach for establishing a temporary field of acceptability in certain circumstances in accordance with an exemplary embodiment of the present invention.

FIG. 3B is a flowchart illustrating an approach for establishing a temporary field of acceptability in certain circumstances in accordance with an exemplary embodiment of the present invention. There may be a third type of field of acceptability, which may be called a "temporary" field of acceptability. A temporary field of acceptability may be established in cases which may call for it, and it may in part be established through the user engagement panel 115. When the driver is outside the permanent field of acceptability, the driver is prompted to submit billing relevant data on the user engagement panel 115 (step 305). The temporary field of acceptability may be established in situations where a driver cannot arrive at the designated location or within the permanent field of acceptability, such as a construction site or a site of police activity. Whether the temporary field of acceptability is established may be based on predetermined rules, one of which is that it may be determined whether an adjustment was issued to a billing request after submission on the user engagement panel 115 (decision 315). If no adjustment was issued, the submission, the relevant billing request, and other data may be recorded in the database 103 (step 311). If there is an adjustment issued, it may next be determined if there is a predetermined number of adjustments made that are substantially similar (e.g., based on the location, based on the reason) (decision 312). If a predetermined number has not been reached, the submission, the relevant billing request, and other data may be recorded in the database 103 (step 311). If a predetermined number of adjustments have been made, the reason for an adjustment may be analyzed, where the establishment of a temporary field of acceptability may depend on the reason for adjustment being a long-term reason (decision 313). Some reasons or photographs reflect long-term conditions which may affect a field of acceptability, such as a change in parking rules such as a no standing any time parking regulation, which would not allow a driver to load or unload a passenger where the regulation may be in effect, while others may only be temporary. If the reason is determined to be long-term, the permanent field of acceptability may be updated based on predetermined rules (step 313). If the reason is not long term, a temporary field of acceptability may be established based on predetermined rules (step 314), where the rules may dictate size of the field of acceptability, which may be made based on the data collected in previous steps or otherwise. A temporary field of acceptability may be established pursuant to the reasons or photographs provided on the user engagement panel 115 in an exemplary embodiment of the present invention, and it may be established to stay in place for a certain number of hours, days, weeks, etc.

The parameters of the previous permanent field of acceptability for a given location may exist within the temporary field of acceptability. The previous permanent parameters may be referred to as the "semi-active" permanent field of acceptability. Since a temporary field of acceptability may be indeed temporary, in some cases a reversion back to the permanent field of acceptability may be appropriate, so it may be beneficial to retain the parameters of the permanent field of acceptability by establishing a "semi-active" permanent field of acceptability (step 315).

According to an exemplary embodiment of the present invention, certain fields of acceptability may be in a state of activity such as active, inactive, or semi-active. Because a submission to the user engagement panel 115 generally regards the applicability of a field of acceptability, a verified billing request where the driver was not in the field of acceptability may also lead to access of the user engagement panel, manually or automatically, to further verify billing relevant data. The state of activity of the field of acceptability may be a determination in part made from one or more submissions on the user engagement panel 115, where predetermined rules establish which data submitted on the user engagement panel 115 is accurate. This may happen dynamically. An "active" field of acceptability herein is intended to refer to a field of acceptability that is currently applicable, where it may apply to time or apply to location in a billing request. An "inactive" field of acceptability may refer to a field of acceptability that has been deactivated because it might be considered inaccurate at the present time. Lastly, "semi-active" may refer to a permanent field of acceptability that may be incorporated with a temporary field of acceptability, where the semi-active permanent field of acceptability is fully activated to the permanent field of acceptability when the temporary field of acceptability is deactivated according to predetermined rules, where certain conditions may trigger the full activation of the semi-active permanent field of acceptability as disclosed in FIG. 3C. Additionally, if such conditions are not met, the semi-active permanent field of acceptability might remain semi-active. The information regarding all fields of acceptability, whether active, inactive, or semi-active, may be stored in the database 103, and it may be used as historical data to make one or more other fields of acceptability more accurate.

Figure 3C:
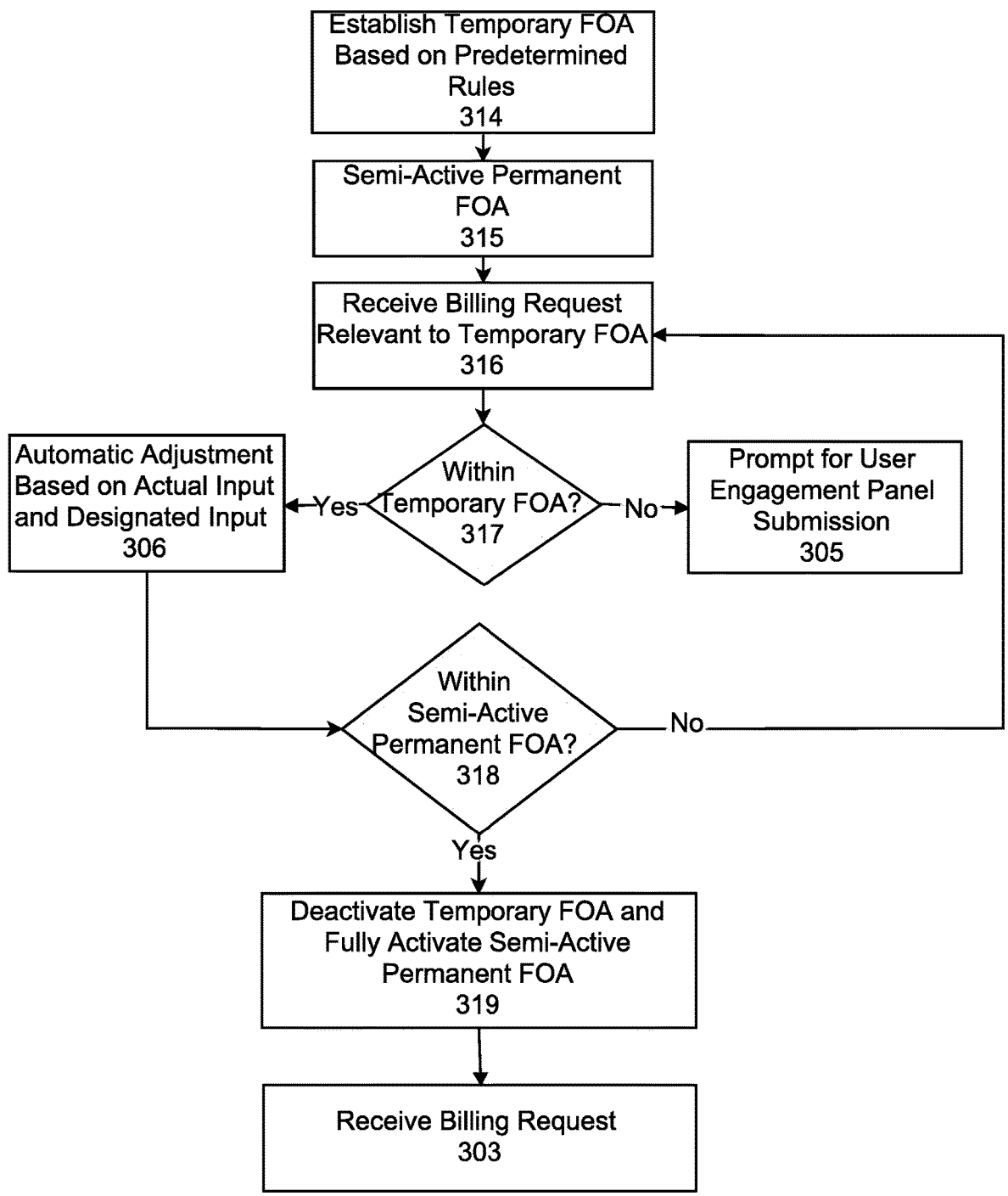
FIG. 3C is a flowchart illustrating an approach for updating the temporary field of acceptability in accordance with an exemplary embodiment of the present invention.

FIG. 3C is a flowchart illustrating an approach for updating the temporary field of acceptability in accordance with an exemplary embodiment of the present invention. When a temporary field of acceptability is in place, as disclosed by steps 314 and 315 of FIG. 3B, a driver may submit a billing request that is relevant to the established temporary field of acceptability (step 316). This might be at any time after a temporary field of acceptability is established or is relevant. It may be determined if the driver is within the temporary field of acceptability (step 317). If the driver is not within the field of acceptability, the driver may be prompted to submit billing relevant data on the user engagement panel 115 (step 305) for an adjustment to be issued. If the driver is within the temporary field of acceptability, there may be an adjustment made to the driver's billing request based on the actual input and the designated input (step 306). However, according to an exemplary embodiment of the present invention, there is a series of conditions which may cause the temporary field of acceptability, once established, to be deactivated. When a driver is detected to be within a temporary field of acceptability and an adjustment is made (step 306), it may be further detected whether the driver is within the semi-active permanent field of acceptability (step 318). If the driver is within the semi-active permanent field of acceptability, this may be an indication that the temporary field of acceptability no longer applies. Such a scenario may trigger the deactivation of the temporary field of acceptability and the full activation of the semi-active permanent field of acceptability (step 319). For example, the temporary field of acceptability was established because of a construction site that lasted for one week, and after the construction site is removed, a driver may again arrive where the construction site once was, which may be within the semi-active permanent field of acceptability. If the driver is not within the semi-active permanent field of acceptability, yet is still within the temporary field of acceptability, the temporary field of acceptability may still apply to the next relevant billing request.

Figure 4A:
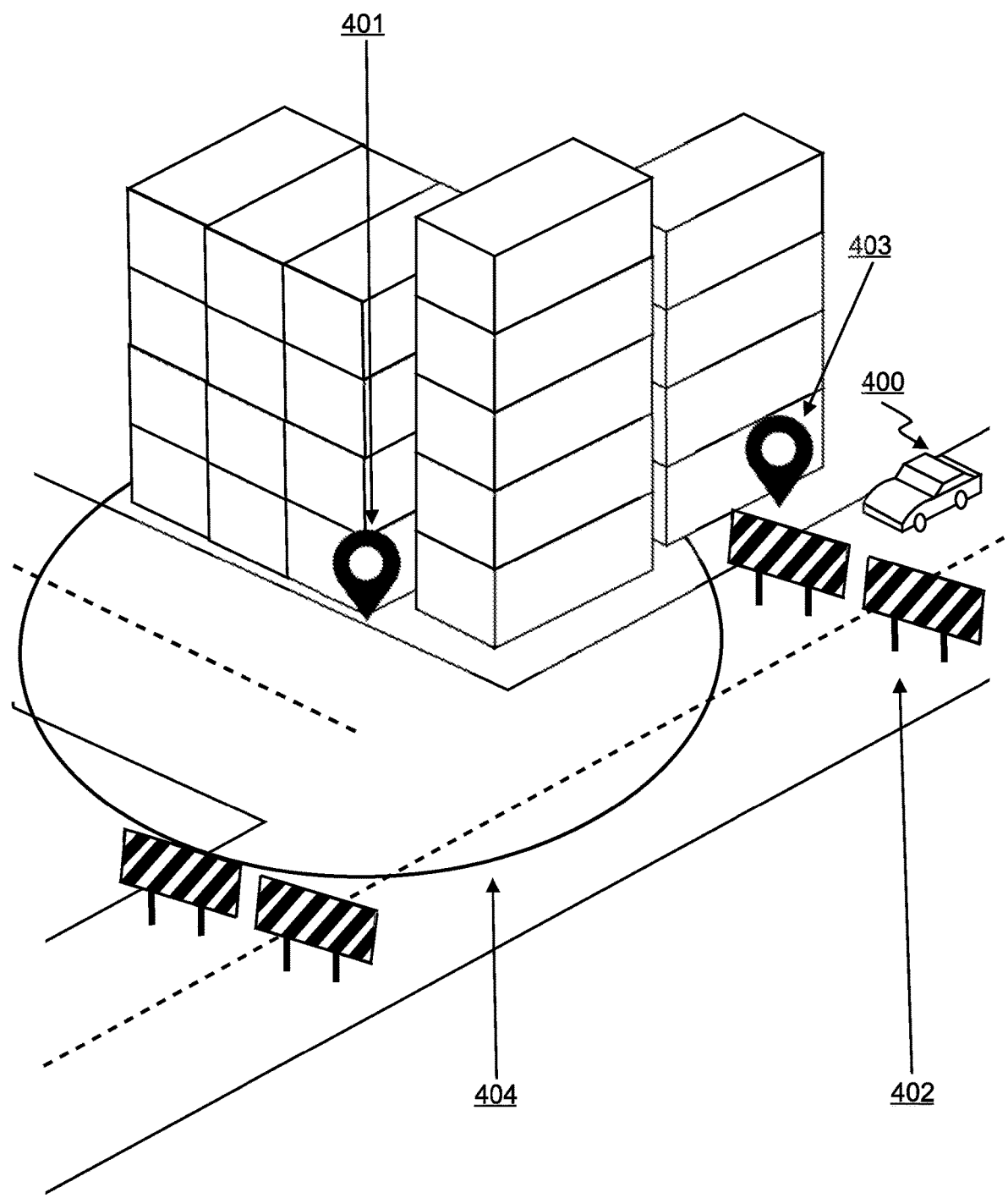
FIG. 4A is a diagram illustrating the application of the field of acceptability based on distance in accordance with an exemplary embodiment of the present invention.

FIG. 4A is a diagram illustrating the application of the field of acceptability based on distance, in accordance with an exemplary embodiment of the present invention. A vehicle 400 (which may include a driver module 105) may be driven by a driver providing a service request, where the designated drop off location 401 is located around the corner. However, in this depiction, the driver is unable to drop the passenger off at the designated drop off location 401 due a construction barricade that is blocking the way 402. As the driver is not able to drop the passenger off at the designated drop off location 401 due to the obstruction, the driver may have to pull over to the shoulder of the street in order to drop the passenger off safely or legally at a location where the actual drop off location 403 would be different. However, since the driver is unable to arrive within the field of acceptability based on distance 404, the driver may be prompted to submit billing relevant data on the user engagement panel 115 to prove that he or she could not get to the designated drop off location 401. In exemplary embodiments of the present invention, there may be many other legitimate reasons for a driver to be unable to arrive at the designated location. Factors may include parking restrictions, road or parking rules, and other temporary road blockages. In some cases, it may simply not be safe for a passenger to disembark the vehicle, where the driver assesses that it may be safer to pull over to a nearby location. Road closures for special security events, parades, rallies, or protests may also make it impractical or impossible to arrive at the designated location, whether the designated location is a drop off or pickup location. All these may be potential reasons a driver can have a location or time discrepancy verified.

Figure 4B:
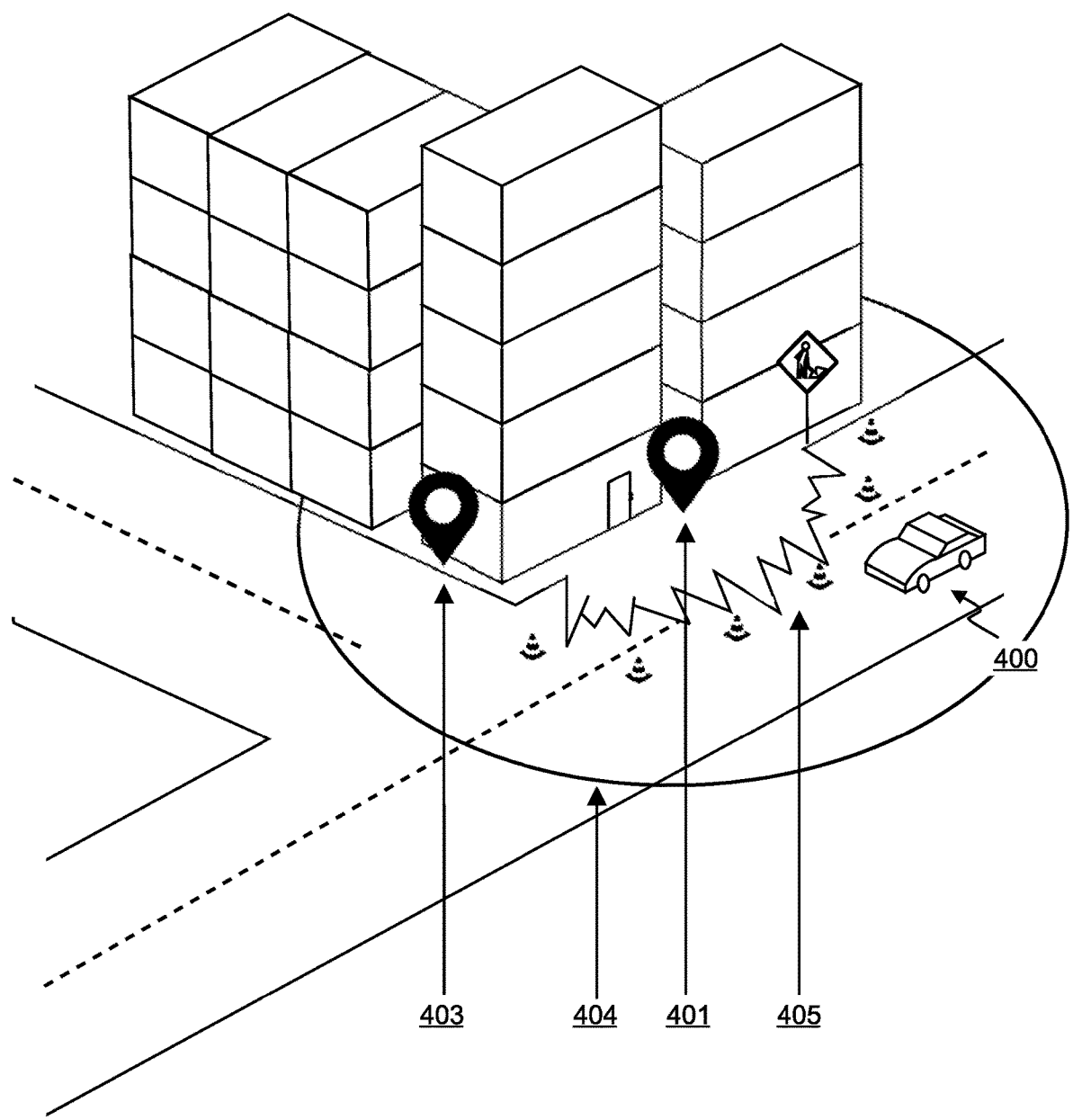
FIG. 4B is a diagram illustrating the application of the field of acceptability based on distance in accordance with an exemplary embodiment of the present invention.

FIG. 4B is a diagram illustrating the application of the field of acceptability based on distance, in accordance with an exemplary embodiment of the present invention. A vehicle 400 (which may include a driver module 105) may be driven by a driver providing a service request, where the designated drop off location 401 is on the right shoulder of the street. However, in this depiction, the driver is unable to pull over to the side of the street in order to drop the passenger off at the designated location due to ongoing construction that is blocking the way 405. As the driver is not able to drop the passenger off at the designated drop off location 401 due to the obstruction, the driver may have to drive around the corner and in order to drop the passenger off safely or legally at a location where the actual drop off location 403 would be deviate from the designated drop off location 401. The field of acceptability based on distance 404 shown in this figure provides an area within which an automatic adjustment for an actual drop off location may be made, if the actual drop off location 403 is within a certain distance of the designated drop off location 401.

However, according to an exemplary embodiment of the present invention, the driver might not have to give special notice of driving to a different address to make a drop off. The field of acceptability based on distance 404 shown in this figure provides an area within which an automatic adjustment for an actual drop off location may be made, if the designated drop off location 401 is within a certain distance of the actual drop off location 403. In FIGS. 4A and 4B the field of acceptability based on distance 404 is depicted as a two-dimensional elliptical. However, it is not intended through this depiction to limit the field of acceptability based on distance 404 to this dimensional constraint; as GPS and geolocation technology (and other geolocation technologies) allow for three-dimensional mapping, those features may be incorporated into the field of acceptability as well. For example, where the destination is a departure entrance at an airport, the departure entrance may be different from the arrival entrance, even though the arrival entrance may be situated directly under the departure entrance, but at identical coordinates.

Figure 5:
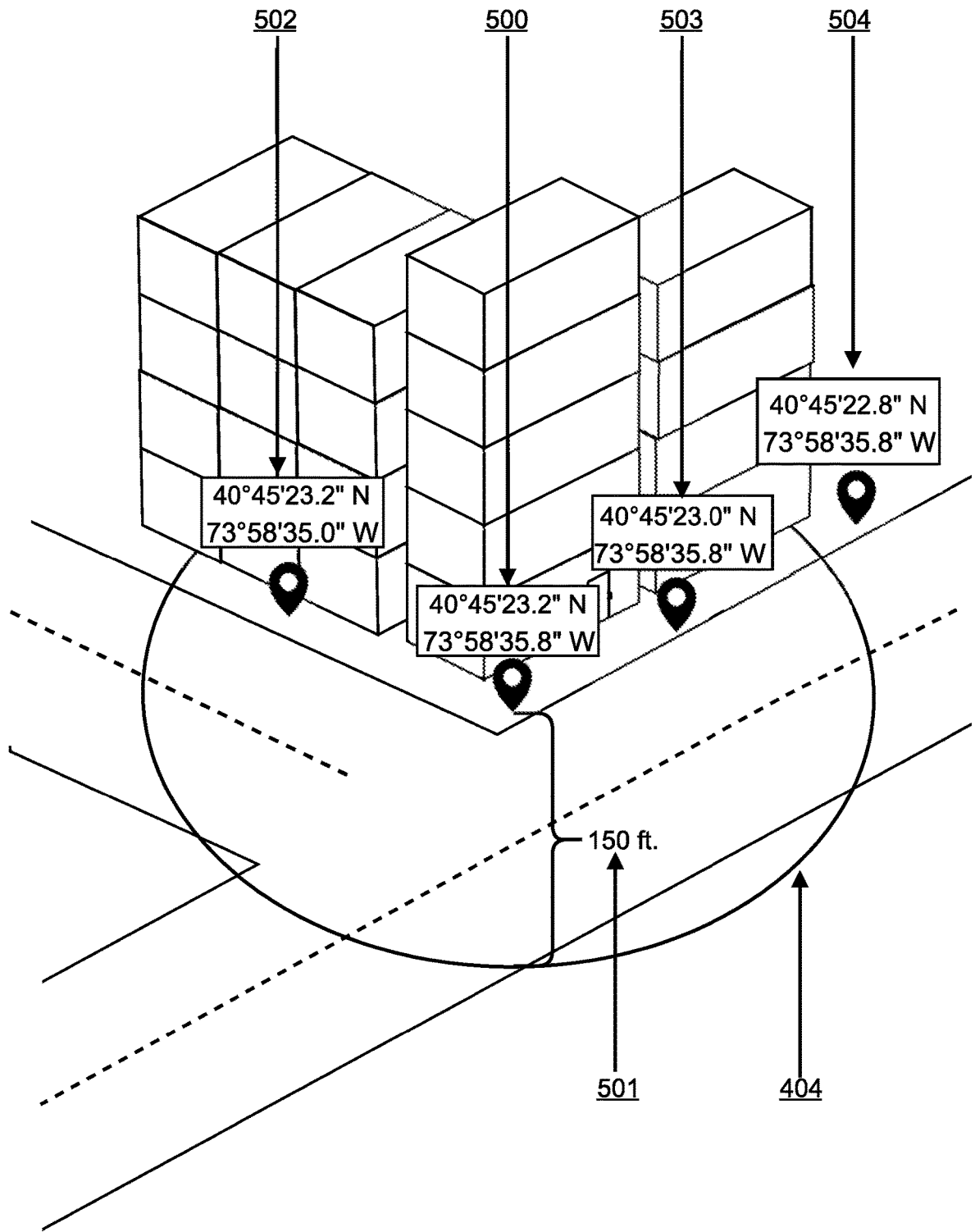
FIG. 5 is a diagram illustrating the field of acceptability established by a buffer and the geolocation coordinates within it, in accordance with an exemplary embodiment of the present invention.

FIG. 5 is a diagram illustrating the field of acceptability established by a buffer and the geolocation coordinates within it, according to an exemplary embodiment of the present invention. The designated location 500, and its associated coordinates, are shown. In this illustration, the field of acceptability based on distance 404 is based on a predetermined rule for a distance of 150 feet 501 from the designated location 500. Shown in this figure are two examples of qualified geolocations 502 and 503, where if a driver were to drop off or pick up a passenger, the geolocation may be automatically adjusted. These locations are qualified geolocations because they are within the field of acceptability. Another geolocation 504 is not a qualified geolocation, as it is not within the field of acceptability based on distance 404 because it is not within 150 feet of the designated location 500. In this case, such a geolocation might not be automatically adjusted to match the designated location 500 if a driver were to make a drop off at this location.

It is to be understood that the coordinate information for the vehicle 400 may be automatically captured by the geolocation identifier 111 and transmitted to one or more servers 100 over the computer network 116, as part of an automatically generated and transmitted bill/invoice/insurance submission. According to one exemplary embodiment of the present invention, the driver module 105 may be incorporated into a taxi-style meter so that electronic billing verification submissions may be impervious to tampering, with GPS data and timestamp data acquired directly by the taxi-style meter.

Figure 6:
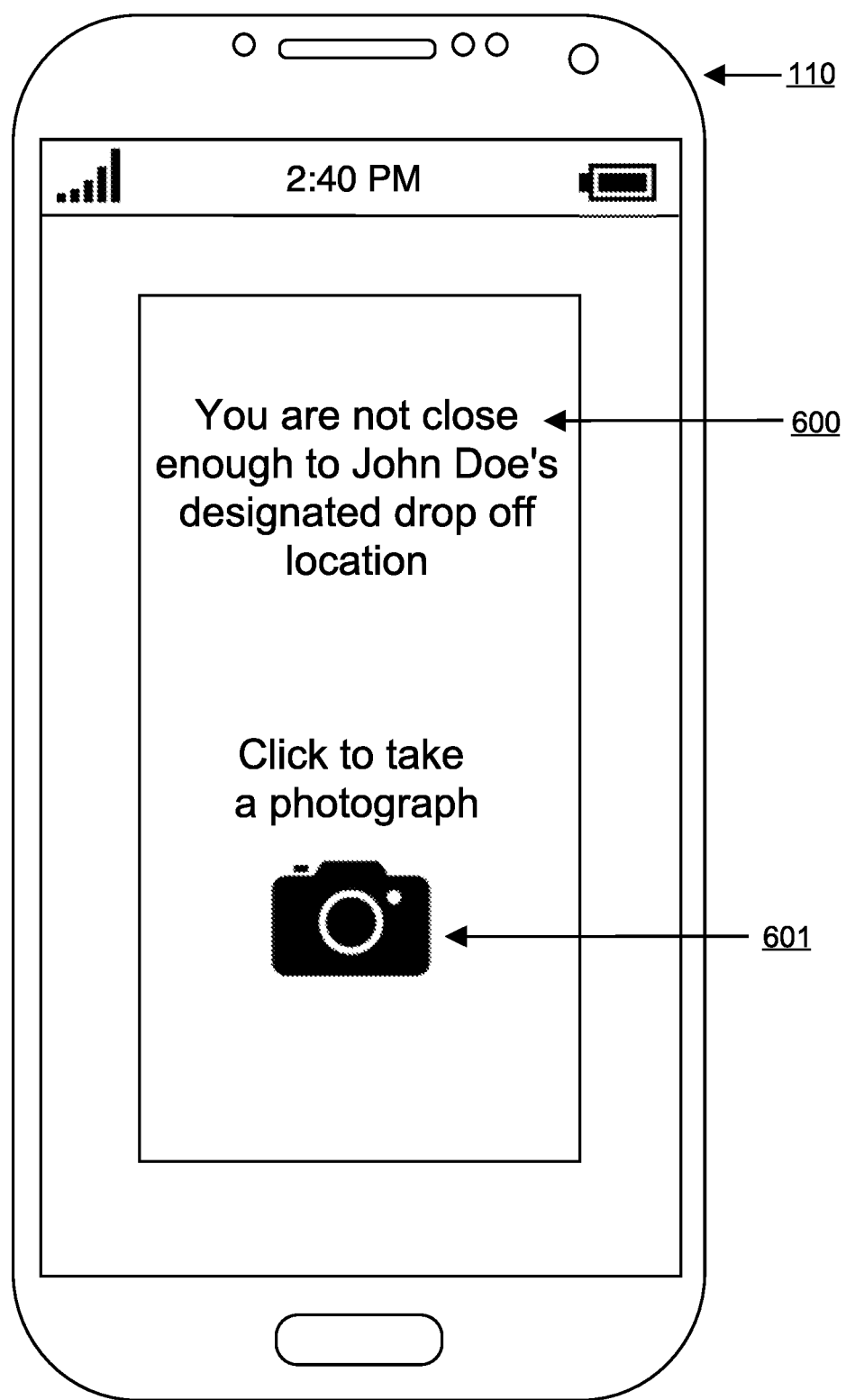
FIG. 6 is a diagram illustrating a potential message a driver may receive on the driver's computing device if the driver attempts to submit a billing request even though the driver is not within the field of acceptability based on distance, in accordance with an exemplary embodiment of the present invention.

FIG. 6 is a diagram illustrating a potential message a driver may receive on the driver's computing device 110 if the driver attempts to submit a billing request even though the driver is not within the field of acceptability based on distance 404, in accordance with an exemplary embodiment of the present invention. In such a scenario, the driver may receive a message 600 which notifies the driver that he or she is not close enough to the designated geolocation and/or designated location for an automatic adjustment. This may cause the driver to move the vehicle closer to the designated geolocation if he or she is able to. If the driver cannot move the vehicle closer, the validity of the reasons for the driver not being able to arrive at the designated geolocation may be established in order to speed up the review process for a billing request. Thus, the driver may be prompted to take a photograph of the street 601 and submit one or more reasons through the user engagement panel 115, which may be reviewed by one or more other users with firsthand experience to verify the driver's submission and its accuracy. A human biller associated with a service provider or vendor may also review the billing relevant data (e.g. the billing request, and/or one or more photographs with a metadata including a timestamp and geotag information or address information) in the case of the driver appealing a rejection, where the service provider can determine the validity of the driver's submission by at least confirming the driver's geolocation.

According to an exemplary embodiment of the present invention, a driver's intent to pick up or drop off a passenger may be identified automatically or submitted manually at the discretion of a driver. In the case of the driver's intent being identified automatically, the driver's intent may be identified analyzing the vehicle's speed and change in speed through at least an accelerometer and/or speedometer 124 which may be connected to the driver module 105 correlated to a driver's predetermined proximity to a designated location, which may be determined through a geolocation identifier 111. The predetermined proximity may be a predetermined distance to the designated location, and the driver can preset the predetermined distance, or the predetermined distance may be based on a default established by the system. A speedometer may measure a vehicle's instantaneous speed, and an accelerometer may measure a vehicle's change in speed, where the speed and change of speed may be used in part to identify intent—for example, it is recorded through the accelerometer that the driver is slowing down, which is correlated to the speedometer, which indicates that the driver is traveling 2 miles per hour. In an exemplary embodiment of the present invention, that may cue the system that a driver might intend to make a drop off. Proximity analysis may additionally be used in coordination with the time as identified by the clock mechanism 113. Since an electronic or digital map or a third-party map API may be integrated in the system, if the vehicle slows down or stops in the middle of the road due to traffic or other reasons and it is too far from a designated geolocation or it is too long until a designated time, the system may disregard such geolocation through the GPS coordinates and velocity data as the location of the intended pickup or drop off. To make sure that the driver in fact has intent to pick up or drop off the passenger, even though such intent has been automatically identified, the driver may be prompted with a notification to confirm his or her pickup or drop off intent.

In the case of the driver's intent being determined through a manual input, the driver may press a button on a driver computing device 110, such as a mobile device, specifically programmed to notify the system of the intent to pick up or drop off the passenger, or the system may be integrated with voice recognition functions to identify a driver's intent through one or more microphones. For example, the driver may command, "Please accept my intent to pick up." According to exemplary embodiments of the present invention, a driver may also set up to notify the system of his or her intent to pick up or drop off a passenger within a predetermined proximity to a designated location, such as a distance of 60 feet.

When intent (e.g. pickup intent or drop off intent) is identified, either automatically or manually, it may then be determined whether the driver is within the field of acceptability. If the driver is determined to be within the field of acceptability, a billing request may be automatically generated and adjusted. If the driver with an identified pickup or drop off intent is determined to be outside the field of acceptability, an alert may be issued to the driver prompting the driver to move closer to the designated geolocation. If the driver, when prompted by the alert, is not able to move closer to the designated geolocation, the driver may then be issued a conditional rejection and prompted to submit billing relevant data through the user engagement panel 115. If, however, the driver when prompted by the alert moves closer to the designated geolocation and is now determined to be within the field of acceptability, an automatic adjustment may be issued. Thus, this type of alert may help the driver avoid receiving a conditional rejection and submitting billing relevant data through the user engagement panel 115, which may save time and resources processing a billing request.

It is to be understood by one of ordinary skill in the art that alerting a driver of being within or otherwise outside the field of acceptability may be based at least on a user's preference. Drivers, for instance, may opt out of receiving such alerts. Vendors may also choose to use or not to use this functionality.

According to an exemplary embodiment of the present invention, confirming the driver's geolocation is contemplated for use by integrating passenger verification information, such as a passenger signature, a passenger finger print, passenger password entry, etc. Furthermore, there may be exceptions for verification which may stem from a passenger being unable to sign for a trip due to disability or another situation. In such scenarios, a trip may be verified by someone such as a home health care aide or a family member of a passenger. As stated, passenger verification may take place at the beginning of service, during service, or at the end of service. Passenger's verification may be collected on the driver module 105, passenger module 120, on a special purpose device, or even on a module that is specifically provided for the passenger. Additionally, these concepts are contemplated for use in multileg or even multi-passenger trip, where a driver may signal that he or she intends to drop off a certain passenger and not another, or intends to pick up an additional passenger. In situations where one or more passengers are being picked up or dropped off at the same location (e.g. multiple members of a family, passengers going to the same hospital, etc.), messages can include information from one or more service requests at once to allow the driver to differentiate and properly carry out those service requests. In a multi-passenger trip, the service provider may have to provide field of acceptability information for one or more individual service requests while one or more other service requests are simultaneously underway. The messages that the driver may receive may be sent in order or organized according to their relevance. For example, there are two passengers in the car, passenger 1 and passenger 2: passenger 1 is currently being dropped off, and passenger 2 is going to be dropped off in 5 miles' distance, the driver is not within the field of acceptability for geolocation for passenger 1's service request—but still attempts to drop off passenger 1—the message that the driver receives may only regard that specific service request for passenger 1 and not for passenger 2.

Figure 7:
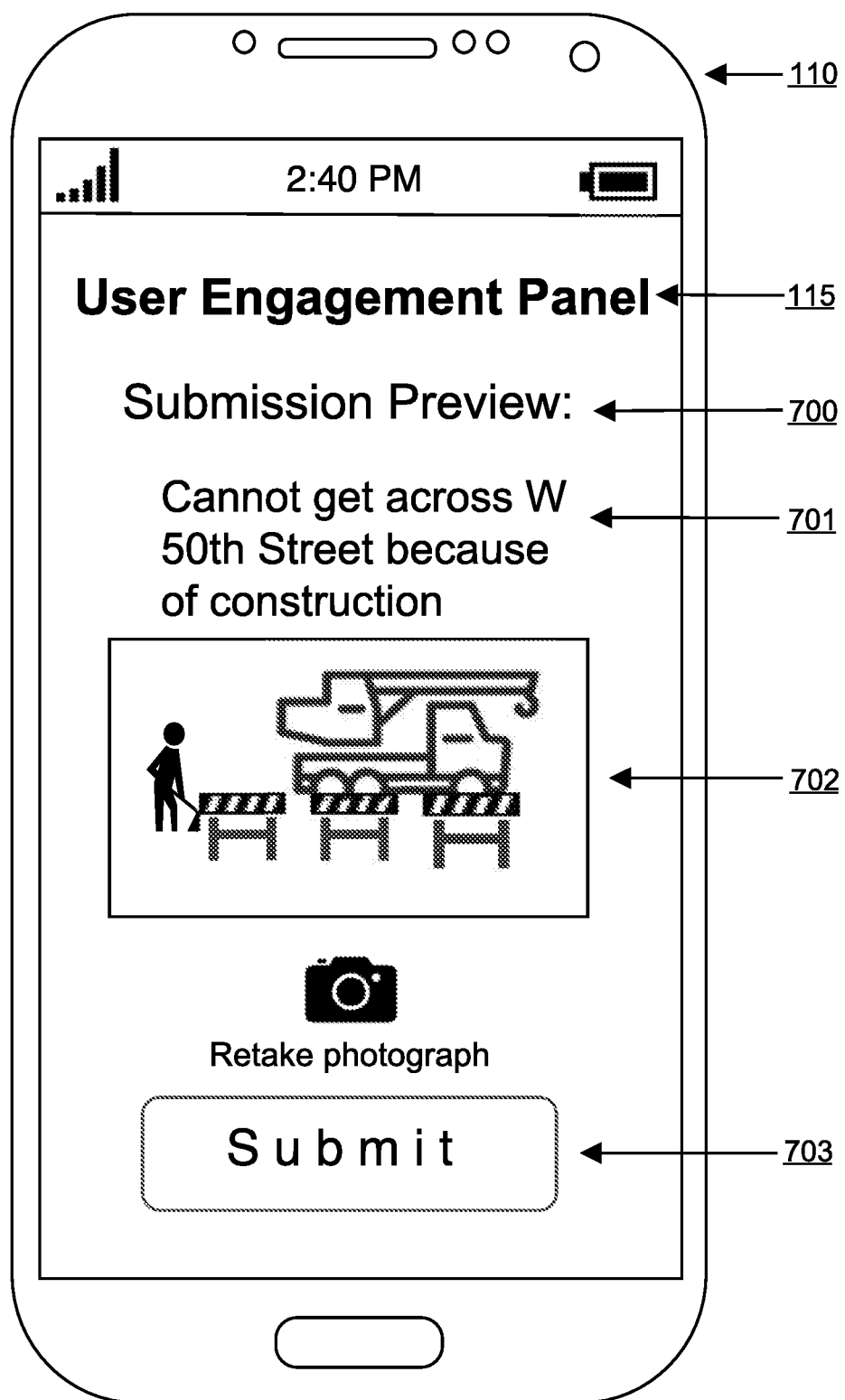
FIG. 7 is a diagram illustrating a preview of a possible submission a driver would make on the user engagement panel for the one or more reasons the driver was unable to arrive within one or more fields of acceptability, in accordance with an exemplary embodiment of the present invention.

FIG. 7 is a diagram illustrating a preview of a possible submission a driver would make through the user engagement panel 115 for the billing relevant data submitted by the driver to prove his/her inability to arrive within one or more fields of acceptability, in accordance with an exemplary embodiment of the present invention. In this diagram, the driver's computing device 110 is depicted as displaying a submission preview 700 on the user engagement panel 115. The driver may type in the one or more reasons for not arriving within one or more fields of acceptability 701. In this example, the driver has entered that there was construction on W 50th Street to provide context for the photo of the construction site 702. The driver then may click a "Submit" button 703 to submit this information through the user engagement panel 115 for further verification by additional users with firsthand experience.

Figure 8:
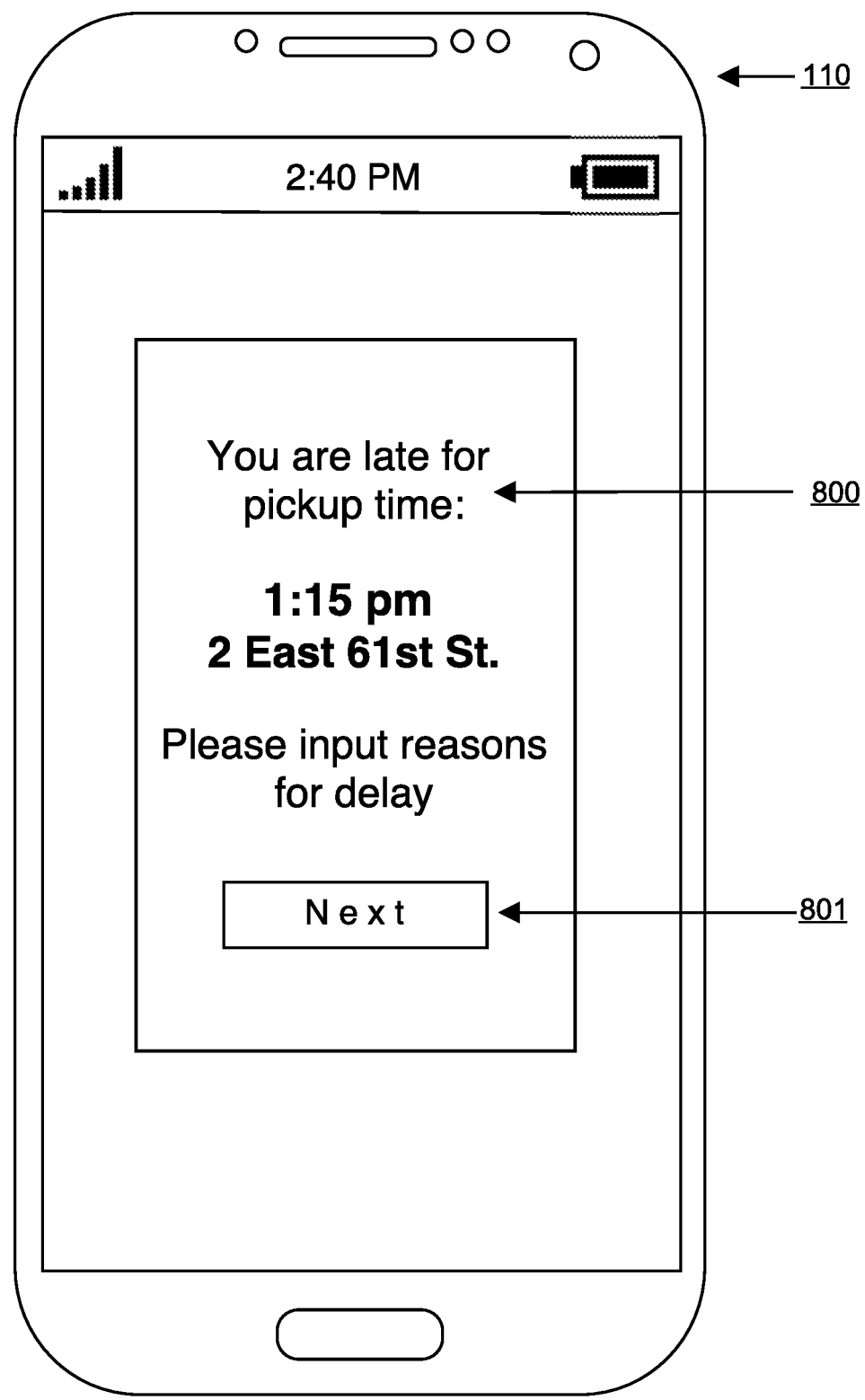
FIG. 8 is a diagram illustrating a potential message a driver may receive on the driver's computing device for failing to be within the field of acceptability based on time, in accordance with an exemplary embodiment of the present invention.

FIG. 8 is a diagram illustrating a potential message a driver may receive on the driver's computing device 110 for failing to be within the field of acceptability based on time, in accordance with an exemplary embodiment of the present invention. This message may be displayed when the driver is considered to be late or when the driver signals intent to make a pickup or drop off, but may not be on time and therefore not within the field of acceptability based on time. On the display of the mobile device is a message 800 that notifies the driver of being late for a pickup time at a designated address. This message may be an indication that the driver is not within the field of acceptability for time. The message may prompt the driver to click the "Next" button 801, depicted here on an interactive touch screen display, where the "Next" button 801 may take the driver to an interface of the user engagement panel 115 where he or she may enter in details regarding the reasons for a delay.

Figure 9:
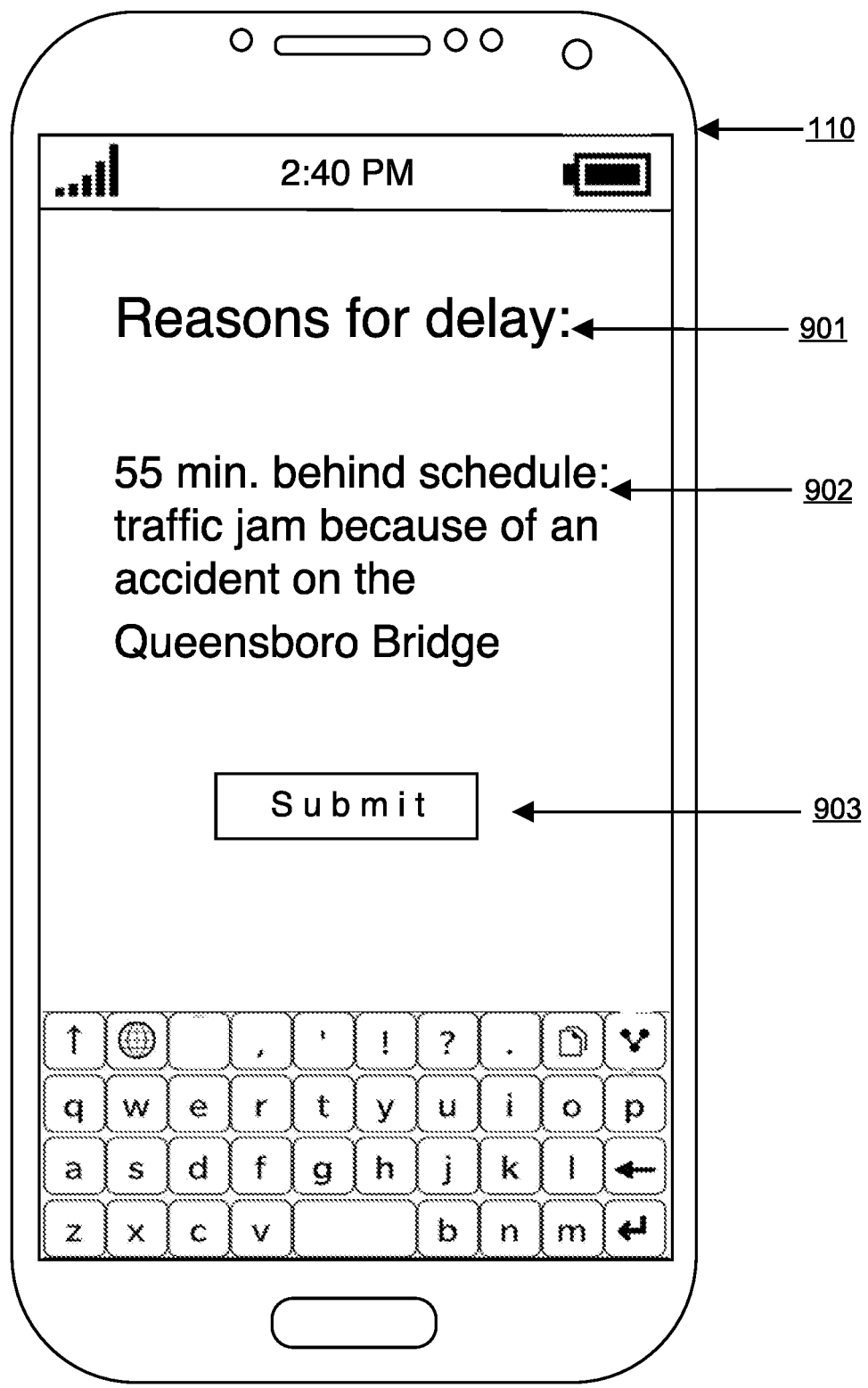
FIG. 9 is a diagram illustrating a potential interface on a driver's computing device for entering one or more reasons for failing to be within the field of acceptability based on time, in accordance with an exemplary embodiment of the present invention.

FIG. 9 is a diagram illustrating a potential interface on a driver's computing device 110 for entering one or more reasons for failing to be within the field of acceptability based on time, in accordance with an exemplary embodiment of the present invention. The driver may be prompted to enter the reasons by typing them into a text field 902. In this example, the title in the text field 901 cues the driver to provide reasons for his or her delay. The driver may then type or dictate the reasons in the text field 902, and may submit those reasons by clicking the "Submit" button 903. The driver may have to enter the reasons for the billing request to be finalized, as it may ease the review process if each billing request that fails to meet the field of acceptability is accompanied by the driver's reasons.

Figure 10:
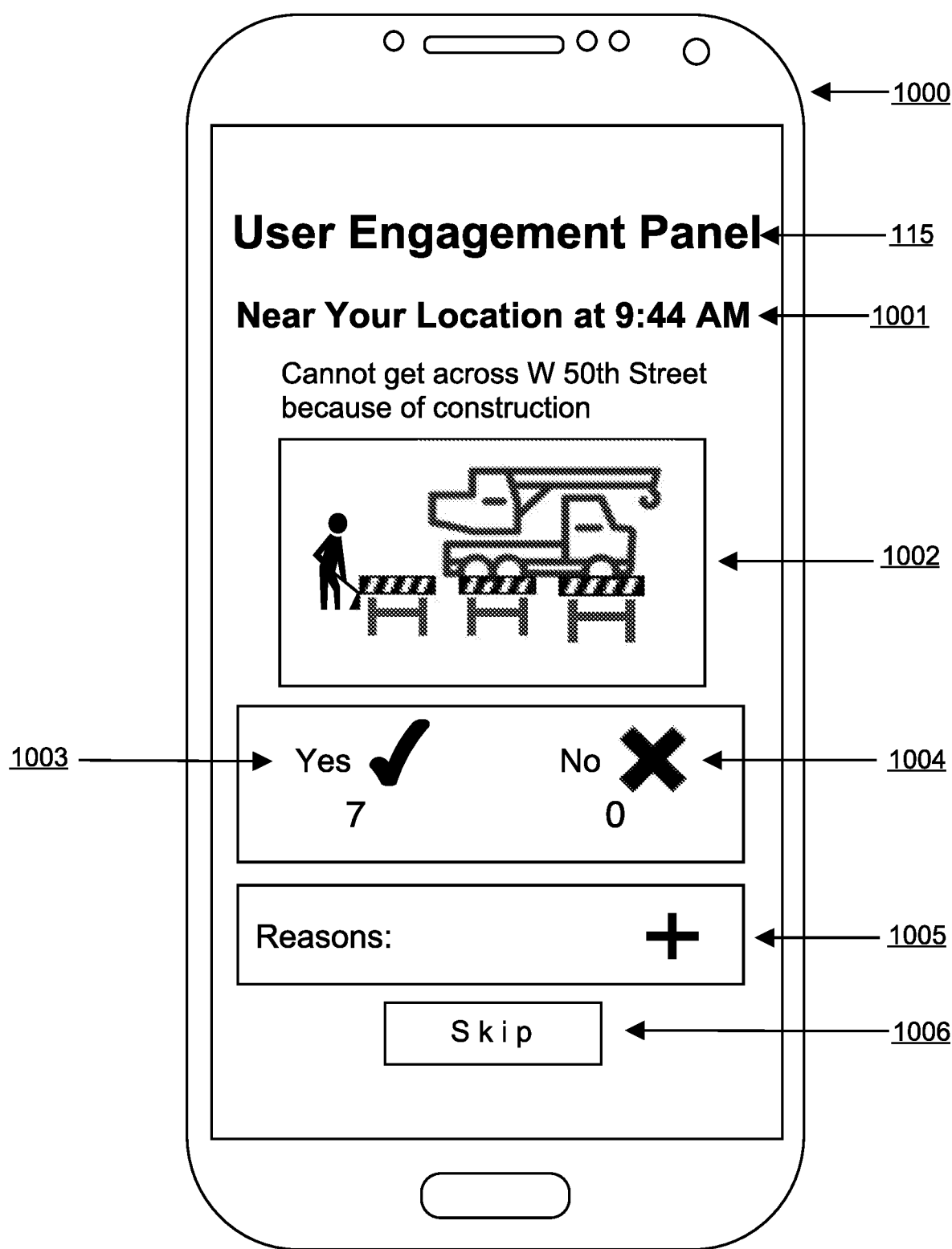
FIG. 10 is a diagram illustrating a potential display of the user engagement panel, in accordance with an exemplary embodiment of the present invention.

FIG. 10 is a diagram illustrating a potential interface of the user engagement panel 115, in accordance with an exemplary embodiment of the present invention. The user engagement panel 115 may be accessed through the user's computing device 1000, where the user may be a driver. Information regarding a billing request submitted by a driver through the user engagement panel 115 may be based on the user's current location or a location where the user was recently 1001, or on the photo and one or more reasons provided by the driver 1002 when prompted by the system. Through the user engagement panel 115, the user can confirm by clicking yes 1003 or deny by clicking no 1004 to vote on whether the provided reasons were accurate, based on the user's determination from the user's firsthand experience. In the event that there is voting controversy (e.g. when the confirmations reach a predetermined number of positive ratings, but there are also a predetermined number of negative ratings), the case may be further opened and reviewed by a relevant party, such as a biller associated with a service provider or a biller associated with a vendor or its agent. The case review may use any information provided that gives additional information, such as the one or more geotagged photos or passenger verification information. The user may also provide one or more reasons for a rating 1005. If the user is unable to confirm or deny the one or more reasons, the user is able to skip by clicking the "Skip" button 1006. Any user with firsthand experience of the service request, geolocation, or time, whether it be a service provider, driver, vendor, or someone else with information, may contribute the data through the user engagement panel. If any crowdsourced data or information is identified to be helpful, either through informing other users or it has received a predetermined number of positive ratings, then a reward may be given to the user who submitted it. The reward may be monetary or nonmonetary such as a gift or type of promotion. Rewarding may provide an incentive for users to use and make submissions on the user engagement panel.

Figure 11:
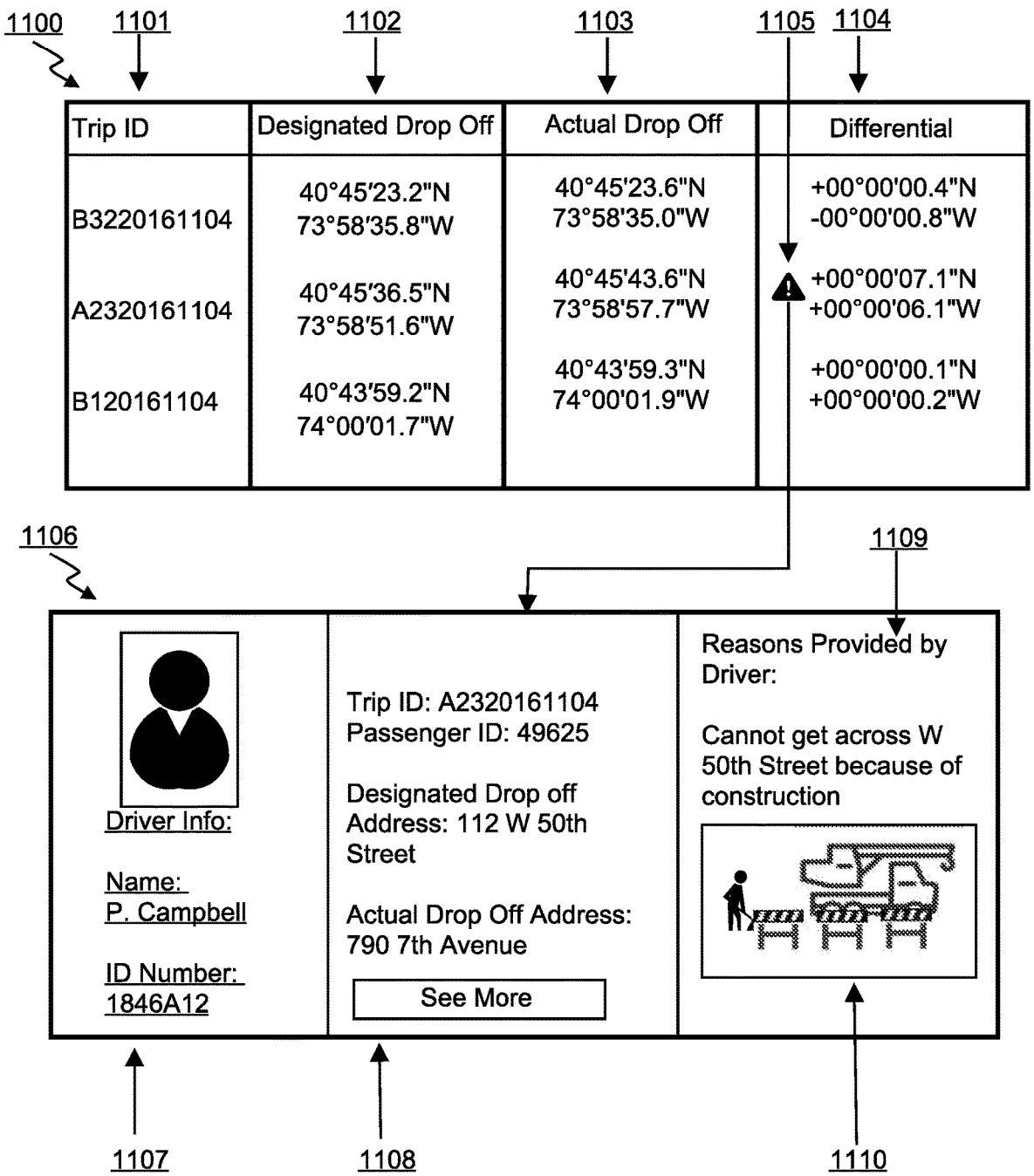
FIG. 11 is a diagram illustrating a database table related to the field of acceptability based on distance, illustrating how data may be collected within the billing verification system and displayed to the service provider on the user engagement panel or elsewhere on the service provider module, in accordance with an exemplary embodiment of the present invention.

FIG. 11 is a diagram illustrating a database table 1100 related to the field of acceptability based on distance 404, in accordance with an exemplary embodiment of the present invention, illustrating how data may be collected within the billing verification system and displayed to the service provider through the user engagement panel 115 or elsewhere on the service provider module 104. For example, the table contains geolocation data relating to a billing request. This table specifically depicts information for drop off. The far-left column shows trip ID information 1101. Also shown are the coordinates 1102 of each of the designated drop off locations, which may have been retrieved from each of the input addresses and geocoded into geolocation coordinates. Also shown are the coordinates of the actual drop off location 1103. The far-right column shows the differential between the coordinates 1104, which would represent whether the actual drop off location was within the field of acceptability. In this figure, it is shown that two of these differentials show geolocations that fall within the field of acceptability, where there is no alert within the billing system. However, one billing request record does have an alert indicator 1105 next to it, because the drop off location differential is too large. This may serve as a visual cue for a service provider to open a case review regarding this information in some situations. A service provider may be able to investigate the reasons for this differential by clicking on the alert indicator 1105, which may bring up another interface of the user engagement panel 115 that shows more comprehensive information about the billing request 1106. Shown in this illustration is information regarding the driver, as well as the photo identification of the driver, his name, and driver ID. Also shown is the detailed driver information 1107, where the trip ID, passenger ID, and the designated and actual drop off geolocations are converted to human-readable addresses 1108. Also, included within the detailed information is the reasoning provided by the driver for having dropped off the passenger at another location 1109. In this illustration, it is shown that the driver cites that there was a construction on West 50th Street, and therefore the driver had to go elsewhere to drop the passenger off. He uploaded a photo 1110 which shows the city streetscape with a construction site as evidence of this, where the photo may be enriched with geotag information and timing information to provide evidence that the driver's reasons are legitimate.

Figure 12:
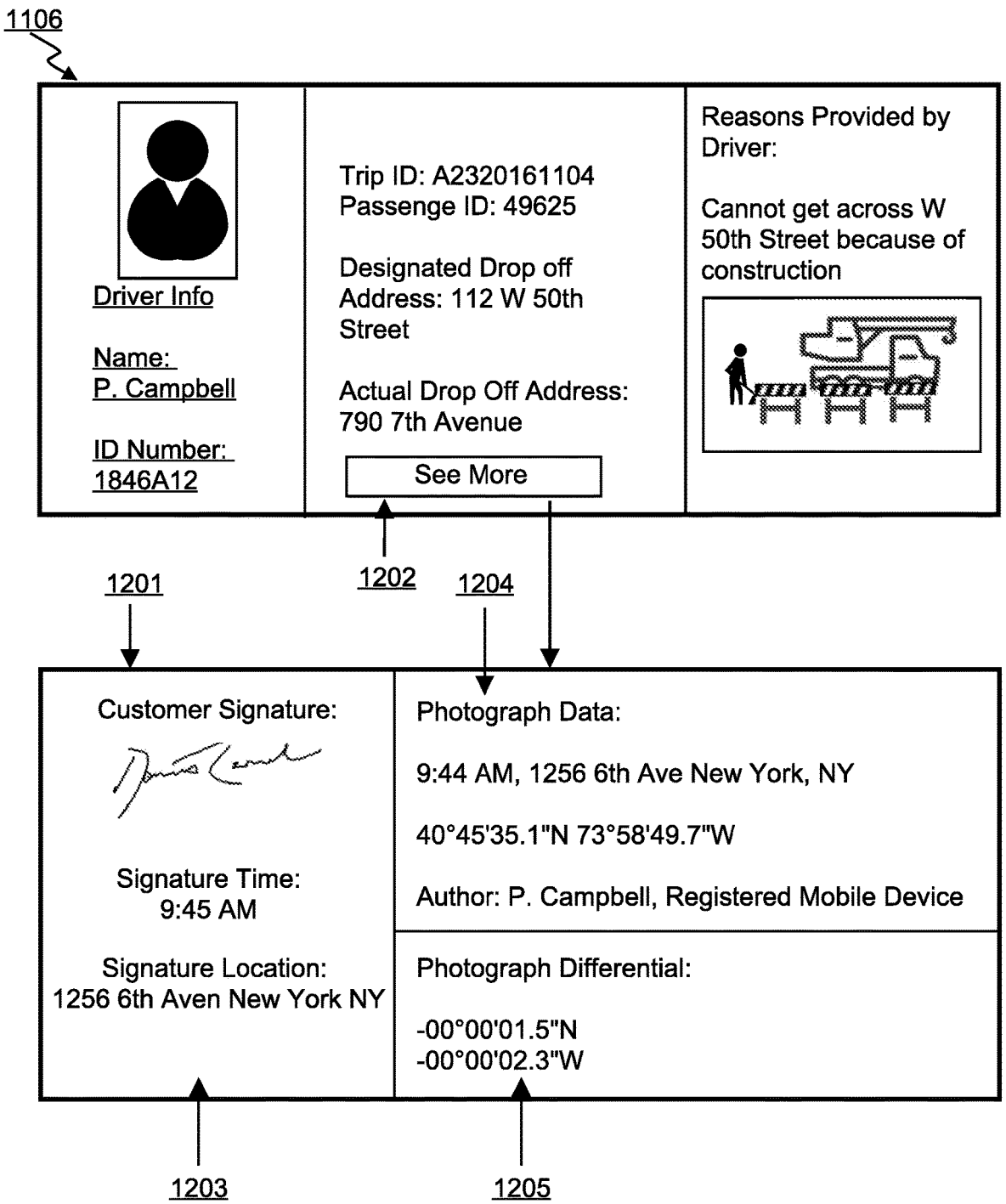
FIG. 12 is a diagram further illustrating an interface of the user engagement panel that shows comprehensive information about a billing request, which may be accessed on the service provider module, in accordance with an exemplary embodiment of the present invention.

FIG. 12 is a diagram further illustrating a potential interface of the user engagement panel 115 that shows comprehensive information about a billing request 1106, in accordance with an exemplary embodiment of the present invention, which may be accessed on the service provider module 104. When a billing request has been flagged for a review or a dispute, it may be reviewed and authenticated by a computing means or by a service provider. In the review process, detailed information may be made available on another display 1201 if "see more" button 1202 is clicked. On that display, there may be a passenger's signature and information about it 1203, which may include a geotag and a timestamp for the signature. In exemplary embodiments of the present invention, passenger verification information can include a fingerprint, iris scan, or other type of physical verification which may be implemented. In addition, verification information can be through an email or SMS code for two-factor authentication, etc. On this display, there may also be the data and information that is mined from the photograph 1204, which could include a time, a human-readable approximate location, as well the geolocation coordinates of the photo and the author of the photo. In an exemplary embodiment of the present invention, the geolocation or time of a passenger confirmation may also be the basis for a field of acceptability analysis, where the field of acceptability is based on the location of the passenger, which could be obtained through a passenger's mobile device. There may be a display of the differential 1205 between the designated geolocation and the geolocation associated with the photograph, which may help the system or the service provider determine the validity of the driver's reasons failing to get within one or more fields of acceptability based on distance 404.

Figure 13:
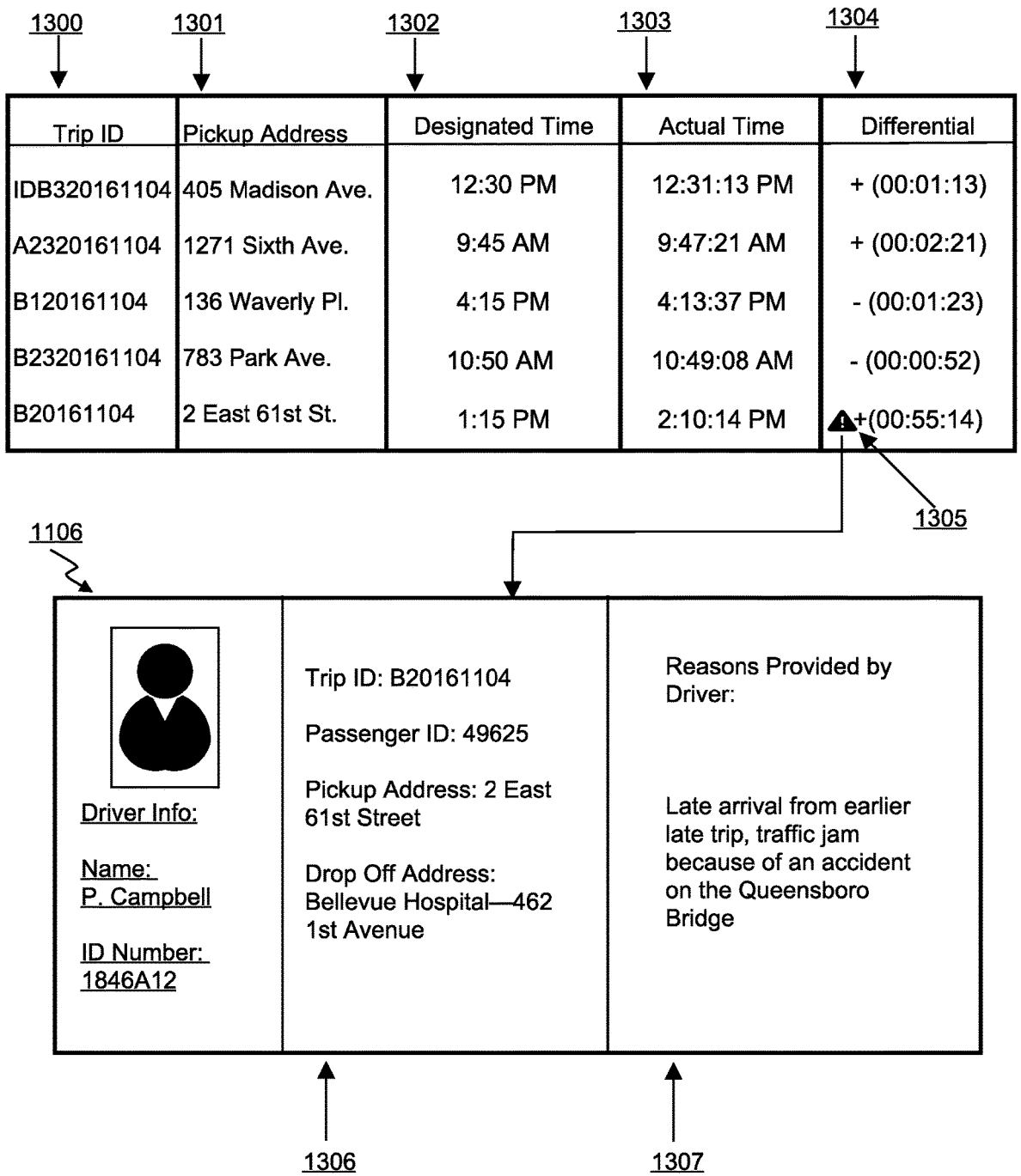
FIG. 13 is a diagram illustrating a database table related to the field acceptability based on time, in accordance with an exemplary embodiment of the present invention.

FIG. 13 is a diagram illustrating a database table related to the field of acceptability based on time, in accordance with an exemplary embodiment of the present invention. This may be made available to a service provider through the user engagement panel 115. Shown in the figure is a table illustrating data corresponding to a unique trip ID field 1300. Associated with each trip ID is information displayed in different columns that relates to each trip ID, where the designated pickup address 1301, designated pickup time 1302, the actual pickup time 1303, along with a differential value 1304, which is based on the time differential between the designated pickup time and the actual pickup time. Each of the first four trips in the trip ID column shows small differences between 52 seconds and 2 minutes and 21 seconds; the last trip ID shows a differential of over 55 minutes. According to an exemplary embodiment of the present invention, one or more servers 100 may prompt the driver to provide one or more reasons through the user engagement panel 115, because there could be no automatic adjustment due to the large time discrepancy—too large to fall into a field of acceptability. That billing request may be flagged by an alert indicator 1305 that notifies a service provider or other relevant party that something may be worthy of attention. This may be before or after the one or more reasons receive a predetermined number of ratings within a predetermined time through the user engagement panel 115. In the case where a service provider or other relevant party is to inspect the details of this billing request, that user would do so by clicking the indicator 1305, which may bring up the detailed driver information 1106 and further details about the billing request 1306, as well as the reasons provided by the driver for the late arrival 1307—in this example, the driver indicated that an earlier trip held up the timing, along with heavy traffic congestion along the route to the pickup location.

Figure 14:
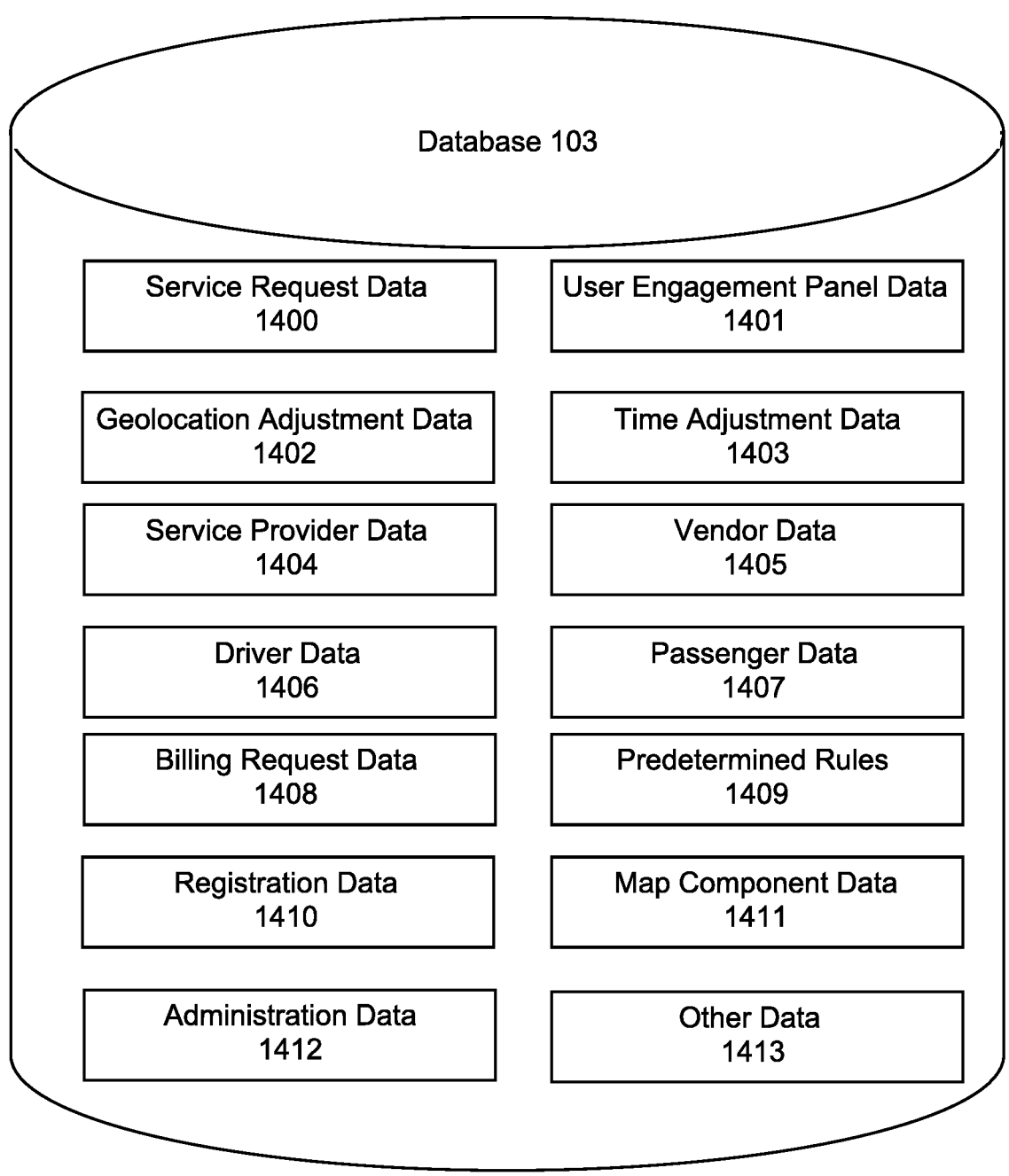
FIG. 14 is a diagram illustrating the data stored in the database, and how the organization of the data may be carried out, in accordance with an exemplary embodiment of the present invention.

FIG. 14 is a diagram illustrating the data stored in the database 103, and how the organization of the data may be carried out, in accordance with an exemplary embodiment of the present invention. There are numerous methods of providing databases and data storage media for the organization and retrieval of specific data, and exemplary embodiments of the present invention are contemplated for use with any appropriate database(s) or storage means. In some implementations, the database 103 can be located and accessed remotely. Further, while referenced as a database, it may be appreciated that the database 103 may include, but is not limited to, a data storage medium, whether structured or unstructured, relational, or otherwise. The database 103 may be dynamically updated as services are booked and completed. The database 103 may store an index of each service request that has been requested and completed, including the registration numbers or user identifications of passengers and drivers, which can be retrieved for reference if needed at any time; the database 103 may also store the details of service requests or billing requests organized for each particular driver, passenger, vendor, or service provider for future reference. The database 103 may contain service request data 1400, such as when and from where a service request was made, who made the service request, who provided the service request, what was the name of the doctor the passenger went to, etc. In addition, any data provided through the user engagement panel 115 (user engagement panel data 1401), may be stored in its own category and there may be subcategories thereof.

All or a portion of service request data 1400 may be provided manually, such as entered in key fields on a computing device, or automatically, where data associated with a passenger that was previously provided or provided elsewhere may be uploaded or imported. One or more servers 100 may be programmed to generate a trip identifier ("trip ID") and assign that identifier to a service request. This is done to organize data in the database 103 and organize those service requests. This organization of service request data 1400 and assigning a trip ID to each service request is helpful in the case of a potential dispute or audit, such as a driver appealing a rejected billing request. The trip ID may be alphabetic, numeric, or alphanumeric, and generated randomly or according to an encrypted or unencrypted key. For example, a driver going from point A to point B on a certain date can be catalogued according to important service request data. For example, service request details may be contained within the trip identifier itself, and there may be an algorithm that translates it into its underlying data. The trip identifier may be used to directly queue relevant data in the database 103.

Further, service request data 1400 may include a passenger's name, ID, and date of birth and also the name of a physician or institution the passenger is being transported to, the associated ID and address, as well as a driver's name, ID, and address. Further, standard details may include codes for the medical care or service that has been requested or pre-authorized, and the date the authorization or request for authorization was submitted and/or issued. Some of this information may only be visible to certain parties; for example, certain protected health information (PHI) or other confidential information might not be available to the driver. The date of authorization may be relevant in a potentially disputed case, because in some situations authorization is invalid after a specified time, and a driver who provided service after the date of validity might not be paid. Pre-authorization of a service request may be appropriate for non-emergency medical transportation. For example, many vendors have standing orders for certain passengers, which are recurring appointments that are scheduled based on the same need for transportation services each time. To one having ordinary skill in the art, the standing orders and their associated details are generally known beforehand, and service requests being scheduled can use the same or similar information regarding previous input (e.g., for an appointment that happens at the same location twice a week, where the passenger is picked up from his or her home and transported to the same clinic). In addition, the vendor may have stipulations regarding how a service request is carried out, where a means to input such stipulations can be provided. This may include stipulations which define the size of the field of acceptability.

One or more servers 100 may include a verification system and one or more interfaces configured to receive data from vendors such as brokers or insurance companies, in some exemplary embodiments through electronic data interchange (EDI), where that data may be stored in the database 103. In certain exemplary embodiments, the verification system connects to scheduling information that includes the designated geolocations and times.

The database 103 may also store geolocation adjustment data 1402, such as the designated and actual geolocations as well as the buffer parameters and/or the field of acceptability for each geolocation. In addition, the database 103 may store time adjustment data 1403, also regarding the buffer parameters and/or the field of acceptability relevant for each time adjustment. The database 103 may also store service provider data 1404, vendor data 1405, driver data 1406, and passenger data 1407. These data may reflect any and all records each user may generate, which may include profiles, service request history, billing request history, etc. The database 103 may store billing request data 1408. The database 103 may be configured to categorize the predetermined rules 1409 that define the field of acceptability, where those rules may be associated with certain service requests, one or more locations or times, one or more vendors, one or more passengers, etc. In this way, one or more servers 100 can retrieve the applicable predetermined rules from the database 103 when needed. In addition, the database 103 may store registration data 1410 of all users. Additionally, the database 103 may store map component data 1411 which may be queried for use as a GIS 102 map layer or for other relevant purposes. Map component data 1411 may contain data retrieved from a third-party geocoding API such as GOOGLE MAPS. Further, the database 103 may be configured to store data related to system administration in administration data 1412, as well as any other data 1413 relevant to the electronic billing verification.

If it is a relational database, then the database tables may have one kind of relationship, such as one-to-many relationships, many-to-many relationships and one-to-one relationships with other database table(s). Every time the system gets the input or request from a vendor or a driver, one or more servers 100 may first open a safe access channel with the database 103 or an associated database center, and then it sends out the query sentences through the access channel to database management module. Based on the relationships between database tables described below, the database management module(s) exactly follows the query sentences and find the specific database table(s) by using ID(s), table names and column names of the tables with or without joining two or more database tables together; if it is a management module, it exactly follows the query sentences and finds the specific data by using keys that query sentences provide. Whether it's a relational or non-relational database, after one or more servers 100 retrieve the targeted data, which may be done through a database management module or by other means, then it sends the search result back to one or more servers 100 through the secured access channel. Then the secured channel is closed until the next time it is opened.

It is to be understood by one skilled in the art that the database 103 may update and sync dynamically whenever data is changed or updated; one or more servers 100 may dynamically update the data to reflect the latest changes, such as the changes in the predetermined rules for the field of acceptability, passenger's address, a vendor's information, new data or information submitted from the user engagement panel (e.g. crowdsourced from users), and the like. In addition, there may be a way to change data back to what it may have been if certain data or data update is proven to be false. In an exemplary embodiment of the present invention, data may be organized or structured in a manner allowing for effective sorting and retrieval. In another exemplary embodiment, the data may be stored in a non-relational or unstructured manner. One of ordinary skill in the art would appreciate that there are numerous methods for providing, storing, and organizing data in a database or other data storage medium, and exemplary embodiments of the present invention are contemplated for use with any appropriate database or data storage medium. In addition, there may be at least one backup database that may back up a primary database in case of data loss in the primary database. Any data in the backup database related to the database 103 may also change according to the changes in the database.

Figure 15:
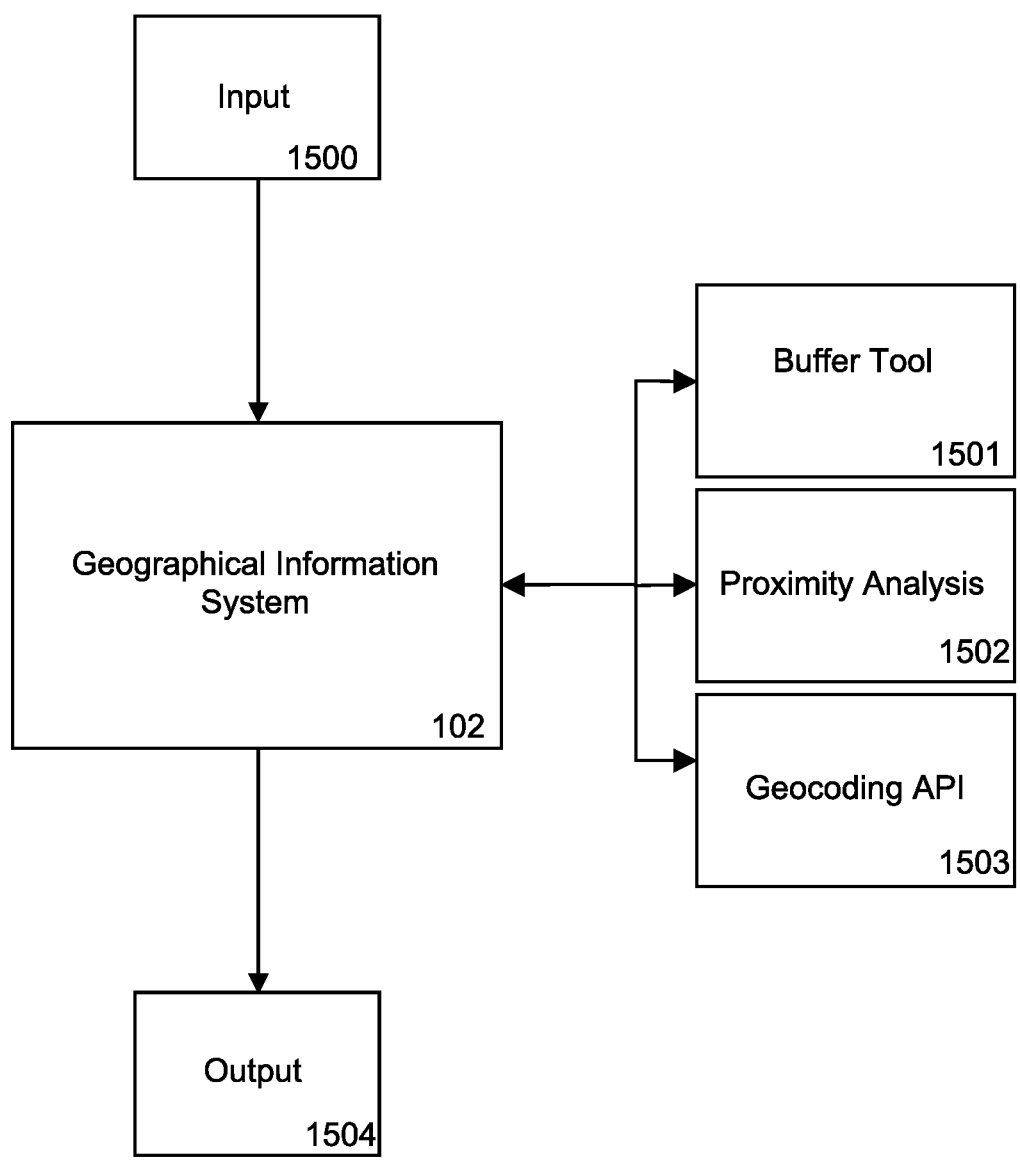
FIG. 15 is a schematic diagram illustrating the potential geoprocessing functions performed by the geographic information system, in accordance with an exemplary embodiment of the present invention.

FIG. 15 is a schematic diagram illustrating the potential geoprocessing functions performed by the geographic information system (GIS) 102, in accordance with an exemplary embodiment of the present invention. The GIS receives input data 1500, which may be geolocation coordinates provided by a driver module 105 or a vendor module 106. In other instances, the input may be an address provided in a service request. The GIS 102 captures, displays, and otherwise analyzes data. The GIS 102 may integrate an electronic or digital map as a layer (such as GOOGLE MAPS) to be viewed on a computing device such as a smartphone, Web-portal, etc. With this integration, roadways may be displayed based on at least map data. The GIS 102 may integrate different layers, where data points with similar attributes can be isolated and output as a layer. That output layer would show all the instances of those data points that have similar attributes. A GIS 102 may be deployed on one or more servers 100 or may function separately sharing a communicative link, such as a wired or wireless connection, with the one or more servers. Through this link, information such as the rules for a billing request or service request may be transmitted. The GIS 102 may establish a field of acceptability using a buffer tool 1501 and/or proximity analysis, and connect to a third-party geocoding API 1503 GOOGLE MAPS or OPENADDRESSES, a global address collection API) to convert addresses into coordinates and coordinates into addresses. In some exemplary embodiments of the present invention, the one or more processing units 123 may establish the field of acceptability, with or without the capabilities of the GIS 102. Based on input data and output needs, the GIS may produce output 1504, which may then be shared communicatively with one or more servers 100 or other relevant system components.

A GIS 102 may be used in concert with one or more servers 100, non-transitory computer-readable storage media 101, and databases 103 for capturing, displaying, storing, manipulating, and analyzing geographic information. To fulfill certain query operations, a GIS 102 can extract and analyze data from the database 103, or data stored within the database is managed by database management system (DBMS). The GIS 102 may be used to visualize the data. This provides a way to usefully sort, access, and view the data. A GIS 102 consists of some important components to carry out its fundamental functions properly. The components of a GIS 102 broadly include: hardware, which entails a central computer or any secondary device attached to it that enables the GIS 102 to be functional; software: algorithms written using executable programming languages to store, analyze, and display geographical data and information; and data: any information to be analyzed, such as pickup and drop off locations, routes, etc. The GIS 102 may be maintained by a technician or other qualified personnel with knowledge of precise upkeep procedures. Different classes or models of a GIS may also be used for different applications. For example, a GIS such as a field model may be necessary to analyze data which changes over continuous areas. Discrete models may be used to analyze data which relates to points in a two-dimensional space. Finally, network models may be used to analyze two points connected by a series of points, such as points along a highway or road.

As discussed above, the vehicle 400 may include the driver module 105 installed therein, for example, as part of a tamper-resistant billing verification device. This billing verification device may receive input from the driver of the vehicle that may include medical insurance information of a passenger, or the passenger may have access to a terminal installed within a back-seat area of the vehicle 400 (which is in communication with the device), and the passenger may use this terminal to provide health insurance (or other payor information) and to confirm the drop off address and time. Upon arrival, a billing verification device may finalize a record of the trip, timestamp and geolocation, and automatically transmit the record to the designated insurance company or other payor, for example, using a cellular radio integrated into the billing verification device. One or more servers 100 may be maintained by the insurance company/payor or an intermediary entity which may reformat the record into a desired syntax of the insurance company/payor as a formal submission and then electronically transmit the formal submission to the appropriate insurance company/payor. The GPS coordinate/time stamp data may be part of the formal submission, and may be used in determining whether to accept or reject the submission, for example, according to the approach discussed above. The transmission of the record to one or more servers, as well as the transmission of the submission from one or more servers to the insurance company/payor may be performed using one or more encryption techniques so that sensitive medical data, which may include the location and time of a patient's medical appointment, may be kept confidential and may be handled in a manner suitable for compliance with The Health Insurance Portability and Accountability Act of 1996 (HIPAA) and other similar statutory requirements.

In this way, exemplary embodiments of the present invention may provide a medical transport vehicle for non-emergency medical transportation that is capable of automatically transmitting an electronic submission for payment to an insurance company or other payor.

Exemplary embodiments described herein are illustrative, and many variations can be introduced without departing from the spirit of the disclosure or from the scope of the appended claims. For example, elements and/or features of different exemplary embodiments may be combined and/or substituted for each other within the scope of this disclosure. Thus, the absence of describing combinations should not preclude having rights to such combinations. Although examples are described in detail herein with reference to the accompanying drawings, it is to be understood that the concepts are not limited to those precise examples. Accordingly, it is intended that the scope of the concepts be defined by the following claims and their equivalents.

What is claimed is:

1. A method for providing automated computer verification for a transportation service, the method comprising:
   receiving, by a server, service request data related to a service request for a passenger, the service request data including at least one of a designated pickup location or a designated pickup time-location, and at least one of a designated dropoff location or a designated dropoff time-location for the passenger;
   establishing, by the server, a field of acceptability based on one or more predetermined rules, wherein the field of acceptability includes corresponding aggregate data comprising at least one of (i) one or more location data sets corresponding to at least one of the designated pickup location or the designated dropoff location, or (ii) one or more time-location data sets corresponding to at least one of the designated pickup time-location or the designated dropoff time-location;
   receiving, by the server, from a driver computing device of one or more computing devices, real-time driver data comprising at least one of a real-time location data set or a real-time time-location data set associated with a respective driver, wherein the real-time driver data is periodically transmitted from one or more location identifiers associated with the driver computing device during performance of the service request;
   identifying, by the server, a particular portion of the real-time location data set or the real-time time-location data set associated with the respective driver which does not match at least a corresponding one of the designated pickup location, the designated dropoff location, the designated pickup time-location, or the designated dropoff time-location of the service request; and
   responsive to the particular portion matching at least a portion of the corresponding aggregate data included in the field of acceptability, displaying, by the server, at least a portion of data related to confirmation of compliance with at least a portion of the service request on the driver computing device.

2. The method according to claim 1, further comprising:
   adjusting, by the server, the field of acceptability based on additional data collected by the one or more computing devices.

3. The method according to claim 1, wherein each location identifier includes a global positioning system (GPS) receiver, and the server is in communication with at least one geographical information system (GIS).

4. The method according to claim 3, further comprising:
   converting, by the GIS, at least one of the designated pickup location or the designated dropoff location into designated geo-location coordinates by geo-coding at least one of the designated pickup location or the designated dropoff location;
   querying, by the server, a database in communication with the server to determine whether the one or more predetermined rules include at least one rule for the designated geo-location coordinates by referencing a unique ID number or a service request identifier, wherein the real-time driver data comprises at least actual geo-location coordinates; and
   confirming, by the server, compliance with the service request by comparing at least the actual geo-location coordinates with the designated geo-location coordinates in accordance with the one or more predetermined rules.

5. The method according to claim 4, further comprising:
   further establishing the field of acceptability by creating a buffer parameter for the designated geo-location coordinates, wherein the buffer parameter is configured to contain a plurality of coordinates within a predetermined distance of the designated geo-location coordinates.

6. The method according to claim 1, wherein the one or more computing devices include one or more GPS receivers, respectively, for identifying location, and the aggregate data further includes at least one of (a) GPS data corresponding to one or more geolocations, or (b) time-location data corresponding to one or more geo-locations at particular times or days.

7. The method according to claim 6, further comprising:
   utilizing the GPS data to identify whether each of the one or more computing devices is within a predetermined distance of one of the designated pickup location or the designated dropoff location of the service request.

8. The method according to claim 1, further comprising:
   receiving, from a plurality of computing devices, additional aggregate data comprising additional location data or additional time-location data;
   storing, in a database, the additional aggregate data; and
   adjusting, by the server, the field of acceptability by including or excluding at least a portion of the additional aggregate data in accordance with the one or more predetermined rules.

9. The method according to claim 1, wherein the designated pick-up location or the designated drop-off location includes an address.

10. The method according to claim 1, further comprising:
    responsive to the particular portion of the real-time location data set or the real-time time-location data set matching the corresponding portion of the aggregate data and not matching a corresponding portion of the service request data, adjusting the particular portion to match the corresponding portion of the service request data.

11. The method according to claim 1, further comprising:
adjusting, by the server, the field of acceptability for at least one of the pickup location or the dropoff location by collecting and storing in a database relevant data from a plurality of computing devices arranged in the network based on the one or more predetermined rules.

12. The method according to claim 1, further comprising:
characterizing, by the server, the field of acceptability as at least one of a preliminary field of acceptability, a permanent field of acceptability, or a temporary field of acceptability,
wherein only one of the preliminary field of acceptability, the permanent field of acceptability, or the temporary field of acceptability is active at a particular time.

13. The method according to claim 12, further comprising:
characterizing, by the server, the field of acceptability as the preliminary field of acceptability for the service request based on one or more predetermined default parameters.

14. The method according to claim 12, further comprising:
collecting, by the server, billing relevant data via one or more user engagement panels associated with the one or more computing devices; and
recharacterizing, by the server, the preliminary field of acceptability as the permanent field of acceptability based on the predetermined rules in accordance with the billing relevant data,
wherein the permanent field of acceptability is characterized as fully active, and
wherein the preliminary field of acceptability and the temporary field of acceptability are characterized as not active.

15. The method according to claim 12, further comprising:
characterizing, by the server, the field of acceptability as the temporary field of acceptability based on a predetermined number of drivers completing services outside the permanent field of acceptability for the dropoff location associated with the service request; and
recharacterizing, by the server, the temporary field of acceptability as an additional permanent field of acceptability based on the predetermined number of drivers completing the services within the temporary field of acceptability.

16. A method for providing automated computer verification for a transportation service, the method comprising:
receiving, by a server, service request data related to one or more service requests for one or more passengers, wherein the service requests are associated with at least one of a pickup location or a pickup time-location, and at least one of a dropoff location or a dropoff time-location;
receiving, by the server, from a plurality of driver computing devices, real-time driver data comprising at least one of a real-time location data set or a real-time time-location data set associated with a plurality of drivers, wherein the real-time driver data is periodically transmitted from one or more location identifiers associated with the plurality of driver computing devices during performance of the one or more service requests;
identifying, by the server, a particular portion of the real-time driver data which does not match at least a corresponding one of the designated pickup location, the designated dropoff location, the designated pickup time-location, or the designated dropoff time-location of the service request;
transmitting one or more rejections, by the server, to the plurality of driver computing devices, associated with the corresponding one of the designated pickup location, the designated dropoff location, the designated pickup time-location, or the designated dropoff time-location of the service request, each rejection indicating that the respective driver is not within a first field of acceptability associated with the corresponding one of the designated pickup location, the designated dropoff location, the designated pickup time-location, or the designated dropoff time-location, wherein the first field of acceptability is based on one or more predetermined rules and includes corresponding aggregate data comprising at least one of (i) one or more location data sets corresponding to the designated pickup location or the designated dropoff location, or (ii) one or more time-location data sets corresponding to at least one of the designated pickup time-location or the designated dropoff time-location, and wherein each rejection prompts the respective driver to:
submit respective service request completion relevant data justifying the respective driver not being within the first field of acceptability;
storing, by the server, the respective service request completion relevant data on the server;
responsive to transmitting a predetermined number of the rejections within a predetermined period of time, adjust, by the server, the first field of acceptability to a second field of acceptability comprising at least the particular portion of the driver data.

17. The method according to claim 16, wherein each rejection transmitted to each respective driver prompts the respective driver to move within the first field of acceptability.

18. The method according to claim 16, wherein each location identifier includes a global positioning system (GPS) receiver and the server includes at least one geographical information system (GIS), and wherein the corresponding aggregate data further includes at least one of (a) GPS data corresponding to one or more geolocations, or (b) time-location data corresponding to one or more geo-locations at particular times or days.

19. The method according to claim 16, further comprising:
transmitting, via a passenger module, information from a particular passenger confirming completion of a particular service request by a particular driver, wherein the information includes at least one of a signature, a PIN, a passcode, a fingerprint, biometric data, or other means for confirming completion of the particular service request, and wherein the information includes at least a timestamp or location data and is provided at one of a start of the particular service request, during performance of the particular service request, or upon completion of the particular service request.

20. The method according to claim 16, wherein the plurality of driver computing devices include a vendor module in communication with the server for receiving a particular service request, a service provider module in communication with the server for receiving the particular service request from the vendor module, and a driver module in communication with the server for receiving the particular service request from the service provider module, and wherein the driver module includes a particular driver computing device associated with a particular driver.

21. The method according to claim 16, further comprising:
receiving, by the server, the real-time driver data from at least one of a driver module associated with a particular driver, a passenger module associated with a particular passenger, or both the driver module and the passenger module.

22. The method according to claim 16, wherein each rejection prompts the respective driver to submit billing relevant data containing evidence of or one or more reasons justifying the respective driver not being within the first field of acceptability while attempting to complete the service request, wherein the one or more reasons include at least one of text data, audio data, image data, or video data.

23. The method according to claim 22, wherein at least one of the one or more computing devices includes a geo-aware camera configured to enable the respective driver to capture data for submission to the system as billing relevant data indicative of a reason for failing to be within the first field of acceptability, and wherein the captured data includes one or more geotagged photos having geotag information and timing information to provide evidence that the respective driver's one or more reasons are legitimate.

24. The method according to claim 22, further comprising:
receiving, by the server, one or more verifications of the billing relevant data from one or more additional drivers having firsthand experience with the billing relevant data through at least one of a plurality of additional computing devices, wherein the firsthand experience is identified as the one or more additional drivers being or having been within a predetermined distance of one or more locations associated with the billing relevant data.

25. The method according to claim 24, further comprising:
adjusting, by the server, a billing request to match a respective service request responsive to the billing relevant data reaching a predetermined number of positive ratings within a predetermined period of time.

26. The method according to claim 24, further comprising:
rejecting, by the server, a billing request responsive to the billing relevant data failing to receive a predetermined number of positive ratings within a predetermined period of time.

27. A method for providing automated computer verification for a transportation service, the method comprising:
receiving, by a server, service request data related to a service request for a passenger, the service request data including at least one of a designated pickup location or a designated pickup time-location, and at least one of a designated dropoff location or a designated dropoff time-location for the passenger;
receiving, by the server, from a first computing device associated with a respective driver, real-time driver data comprising at least one of a real-time location data set or a real-time time-location data set associated with the respective driver, wherein the real-time driver data is periodically transmitted from one or more location identifiers associated with the first computing device during performance of the service request;
identifying, by the server, a particular portion of the real-time driver data which does not match at least a corresponding one of the designated pickup location, the designated dropoff location, the designated pickup time-location, or the designated dropoff time-location of the service request;
transmitting, by the server, a rejection to the first computing device for not being within a first field of acceptability, wherein the first field of acceptability is based on one or more predetermined rules, and includes corresponding aggregate data comprising at least one of (i) one or more location data sets corresponding to at least one of the designated pickup location or the designated dropoff location, or (ii) one or more time-location data sets corresponding to at least one of the designated pickup time-location or the designated dropoff time-location, and wherein the rejection prompts the driver to submit service request completion relevant data justifying the driver not being within the first field of acceptability;
storing the service request completion relevant data on the server;
displaying at least a portion of the relevant data, via one or more additional computing devices, to one or more additional users having firsthand experience;
responsive to receiving, from the one or more additional users, via the one or more additional computing devices, one or more verifications of the relevant data comprising one or more ratings:
adjusting, by the server, the first field of acceptability to a second field of acceptability comprising at least the particular portion of the driver data upon the one or more ratings reaching a predetermined number of positive ratings within a predetermined period of time.

28. The method according to claim 27, further comprising:
adjusting, by the server, the first field of acceptability based on a predetermined number of drivers submitting billing relevant data containing evidence or one or more reasons justifying not being within the field of acceptability.

29. The method according to claim 27, further comprising:
determining, by the server, whether the first field of acceptability needs an adjustment, wherein the adjustment is triggered by collection of a predetermined number of conditional rejections of billing requests; and
in response to receiving the predetermined number of conditional rejections of billing requests within a predetermined period of time, adjusting, by the server, the first field of acceptability for the designated pickup location or the designated dropoff location.

30. The method according to claim 27, wherein each location identifier includes a global positioning system (GPS) receiver and the server includes at least one geographical information system (GIS), and wherein the corresponding aggregate data further includes at least one of (a) GPS data corresponding to one or more geolocations, or (b) time-location data corresponding to one or more geo-locations at particular times or days.

* * * * *